(12) United States Patent
Matono

(10) Patent No.: US 6,971,156 B2
(45) Date of Patent: Dec. 6, 2005

(54) METHOD FOR MANUFACTURING A THIN FILM MAGNETIC HEAD

(75) Inventor: Naoto Matono, Saku (JP)

(73) Assignee: Sae Magnetics (H.K.) Ltd., (HK)

( * ) Notice: Subject to any disclaimer, the term of this patent is extended or adjusted under 35 U.S.C. 154(b) by 0 days.

(21) Appl. No.: 10/117,732

(22) Filed: Apr. 4, 2002

(65) Prior Publication Data

US 2002/0176205 A1  Nov. 28, 2002

(30) Foreign Application Priority Data

Apr. 20, 2001  (JP) .............................. 2001-122665

(51) Int. Cl.[7] .................. G11B 5/127; H04R 31/00
(52) U.S. Cl. ................. 29/603.15; 29/603.07; 29/603.13; 29/603.14; 29/603.16; 216/39; 216/41; 216/48; 360/123; 360/317
(58) Field of Search ........... 29/603.07, 603.13–603.16; 360/123; 216/39, 41, 48

(56) References Cited

U.S. PATENT DOCUMENTS

| 4,760,481 A | * | 7/1988 | Yuito et al. ............... 360/123 |
| 4,878,290 A | | 11/1989 | Masud et al. |
| 5,081,056 A | * | 1/1992 | Mazzali et al. ............ 438/262 |
| 5,255,142 A | | 10/1993 | Williams et al. |
| 5,837,428 A | * | 11/1998 | Huang et al. ............... 430/313 |
| 6,169,642 B1 | * | 1/2001 | Mino et al. ................. 360/126 |

FOREIGN PATENT DOCUMENTS

JP    07066211 A  *  3/1995  ....... H01L 21/3213

OTHER PUBLICATIONS

"highly Sensitive Single Pole Head with Laminated Thin Film Coils"; Jiang, N.; Muraoka, H.; Nakamura, Y.; Magnetics, IEEE Transactions on , vol. 31 Issue 6 , Nov. 1995; pp.: 2715-2717.*

* cited by examiner

Primary Examiner—A. Dexter Tugbang
Assistant Examiner—Paul D. Kim
(74) Attorney, Agent, or Firm—Kenyon & Kenyon

(57) ABSTRACT

A thin film magnetic head capable of improving a high frequency response characteristic and the efficiency of the head, and reducing the manufacturing time, and a method of manufacturing the thin film magnetic head. After laminating a precursory layer for forming a coil pattern, a precursory layer for forming a separate layer, and a precursory layer for forming a coil pattern, these layers are continuously patterned with the use of a mask by etching to selectively form the coil pattern, the separate layer and the coil pattern in a batch process. The number of the manufacturing steps (the number of photolithography processes) is reduced compared with the case where the coil pattern, the separate layer, and the coil pattern are formed by plating in separate processes, so that a thin film coil comprising the coil patterns can be formed in a shorter time.

7 Claims, 40 Drawing Sheets

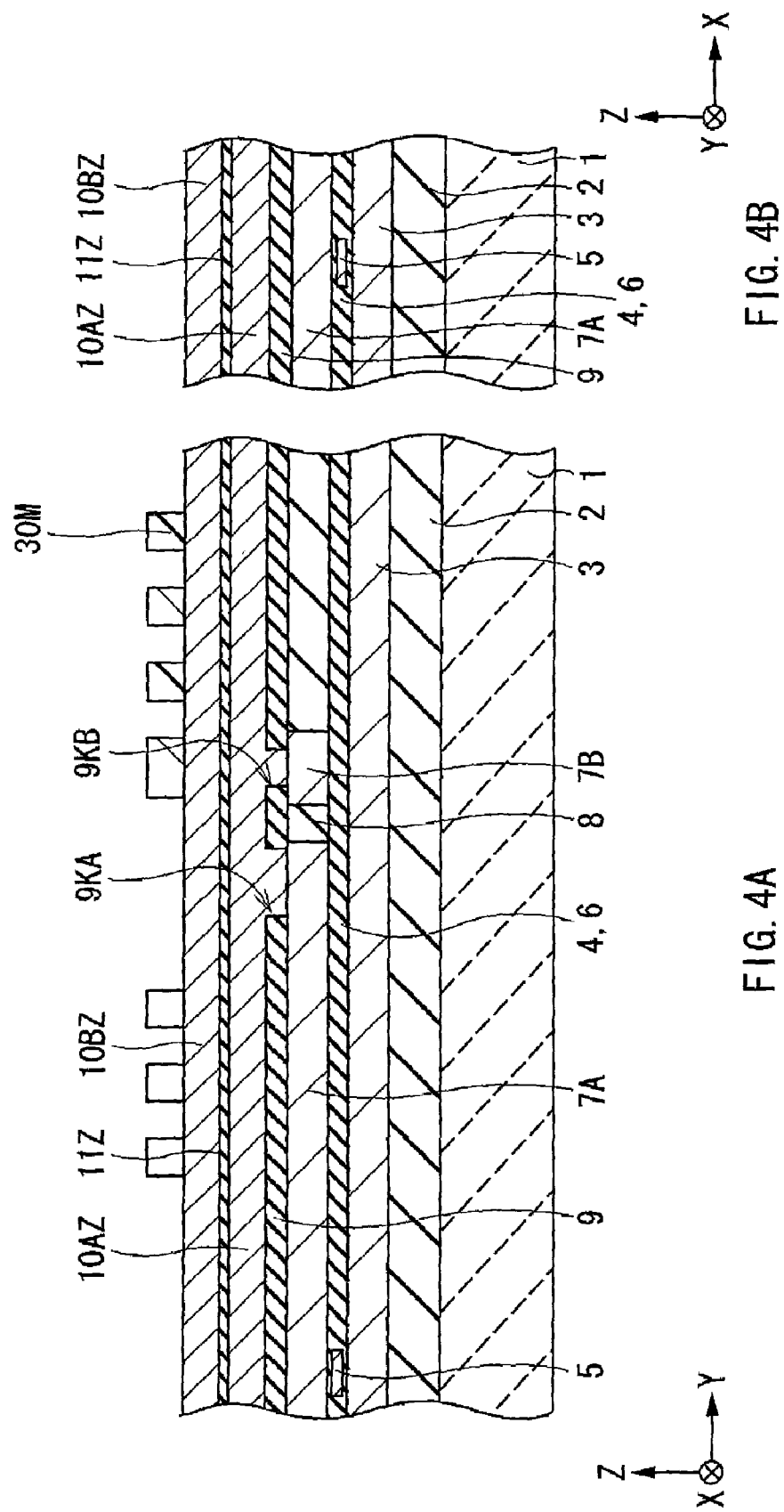

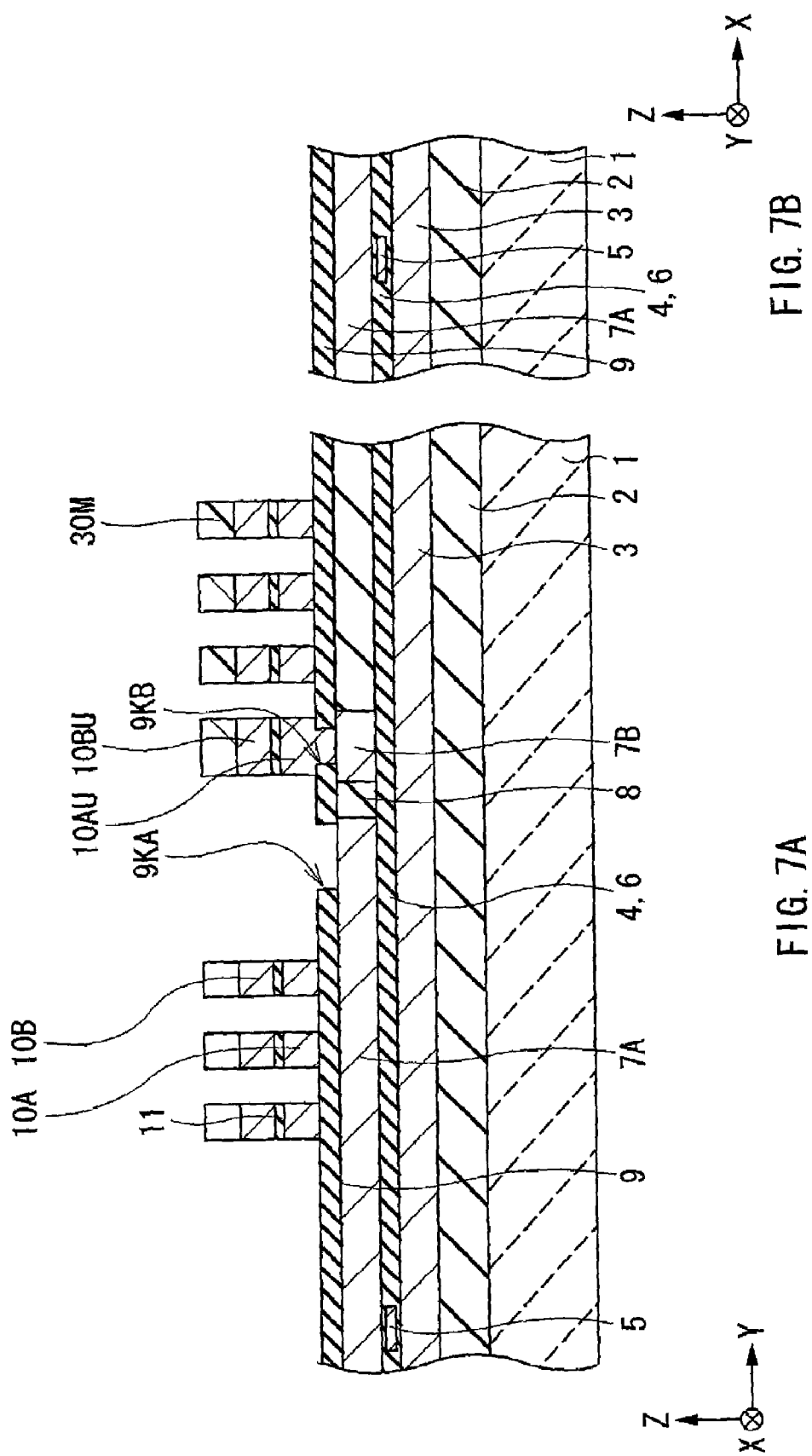

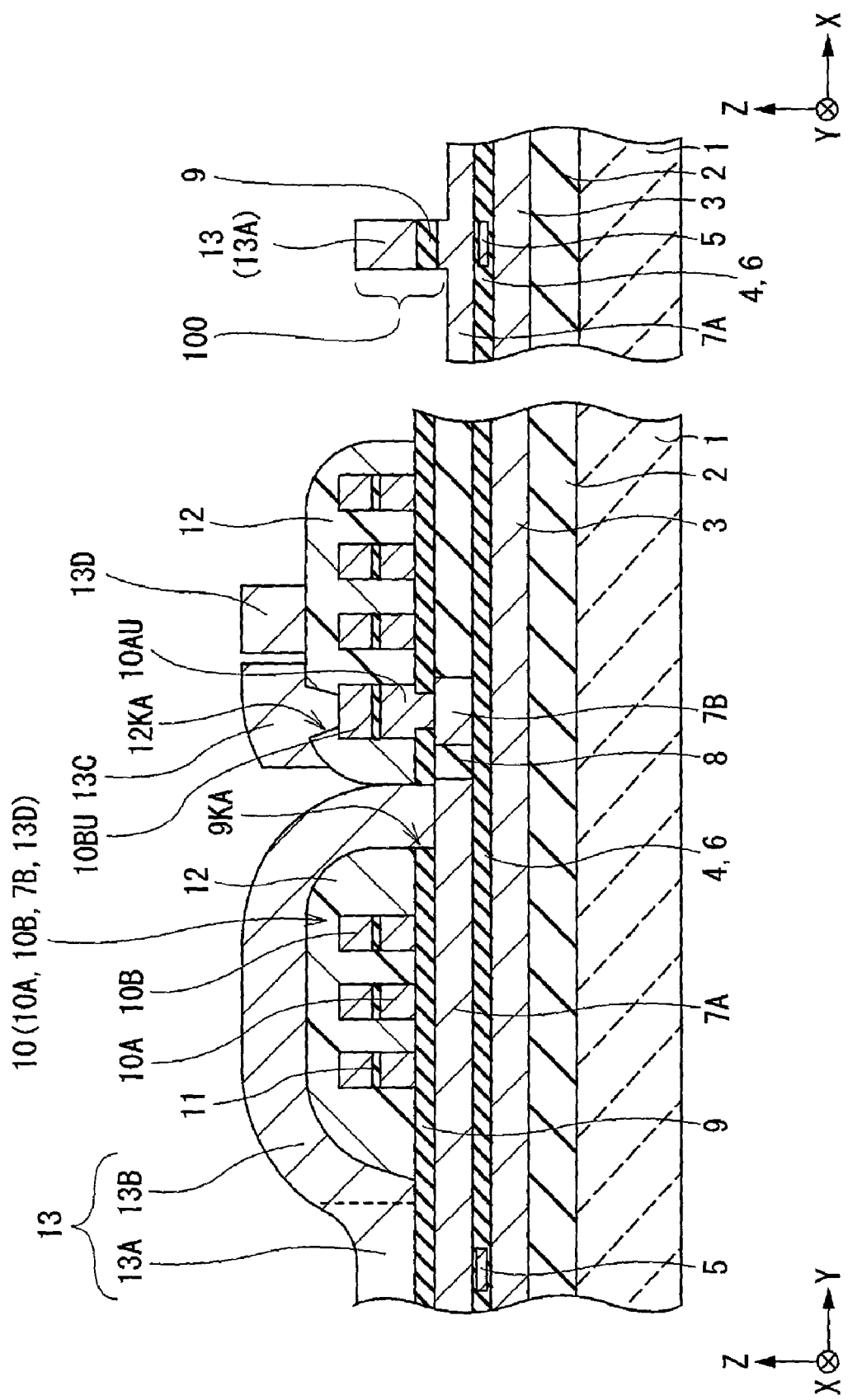

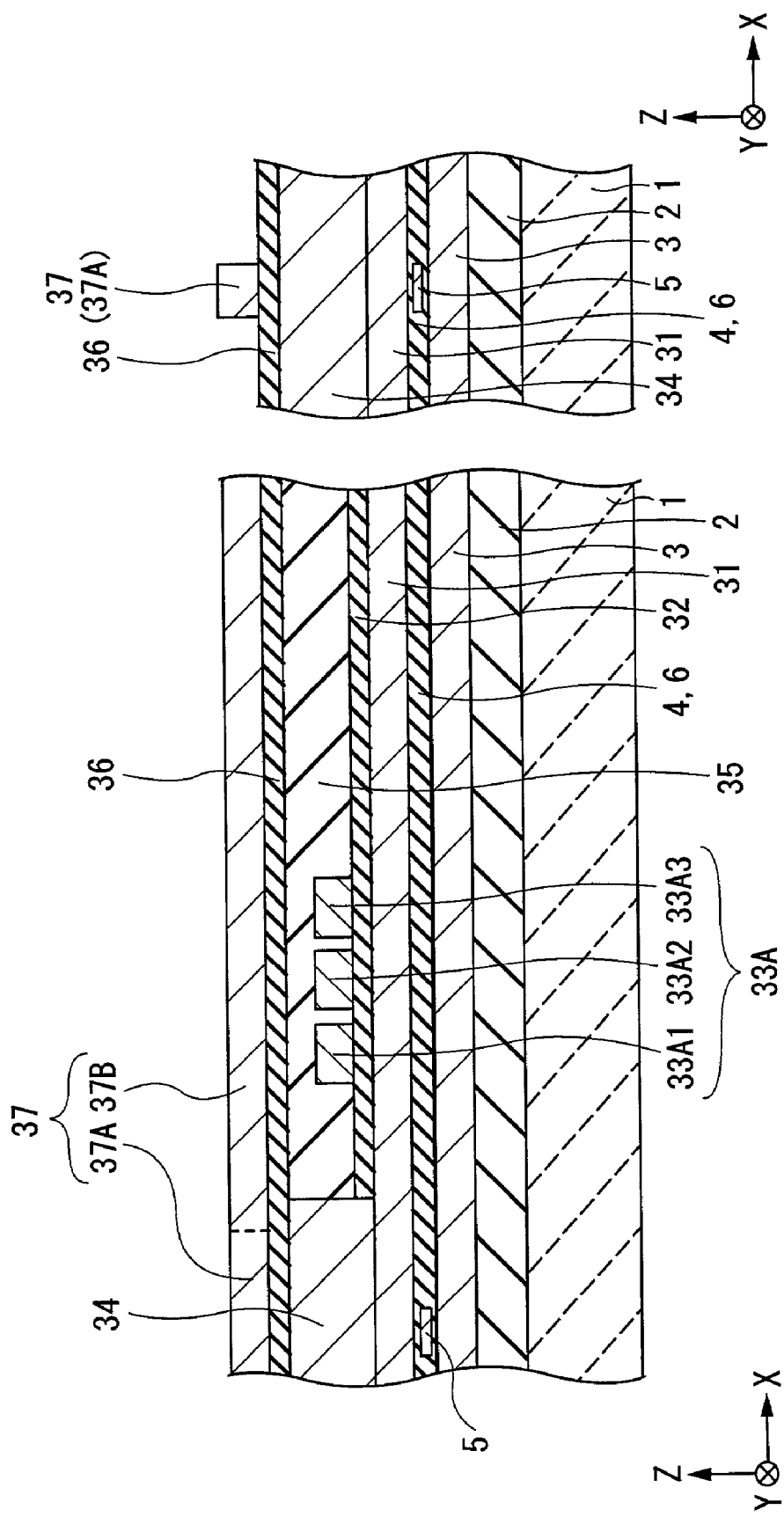

METHOD FOR MANUFACTURING A THIN FILM MAGNETIC HEAD

BACKGROUND OF THE INVENTION

1. Field of the Invention

The present invention relates to a thin film magnetic head having at least an inductive magnetic transducer for writing, and a method of manufacturing the thin film magnetic head.

2. Description of the Related Art

Recently, an improvement in performance of a thin film magnetic head has been sought in accordance with an increase in a surface recording density of a hard disk drive. A composite thin film magnetic head, which has a laminated structure comprising a recording head having an inductive magnetic transducer for writing and a reproducing head having a magnetoresistive (hereinafter referred to as MR) element for reading, is widely used as the thin film magnetic head.

The recording head comprises a top pole and a bottom pole, which are located respectively at the top side and the bottom side of a write gap, and are magnetically coupled to each other at an end thereof; and a coil for generating a magnetic flux. The top and bottom poles have areas with the same uniform width near the region of the write gap close to a recording-medium-opposite surface (air bearing surface) facing a magnetic recording medium (hereinafter referred to as a "recording medium"). These parts constitute a "magnetic pole tip portion' which defines a record track width.

Among coil structures, for example, a "spiral structure" in which a coil is wound around the connecting part between the top pole and the bottom pole in two dimensions (in one plane), a "helical structure" in which two coils are wound around the top pole and the bottom pole, respectively, and a "toroidal structure" in which a coil is continuously wound around the top pole and the bottom pole are known. In the thin film magnetic head having a coil with the spiral structure formed in two dimensions from among these coil structures, for example, a region occupied by the coil in a thickness direction is comparatively small, thereby the head as a whole can be thin compared with the head having a coil with the helical structure or toroidal structure. However, when turns of the coil are increased in order to increase the generation of magnetic flux, the region occupied by the coil is extended in the direction of two dimensions, thereby resulting in an increase in the radius of the coil, so a problem such as a decline in a high frequency response characteristic in the head will occur. The increased radius of the coil leads to an extension of regions where the top pole and the bottom pole are located in the direction of two dimensions, thereby resulting in an extension of the length of a propagation path (magnetic path) for magnetic flux constituted by the top pole and the bottom pole.

In the case where the coil with the spiral structure is used, as means for preventing the decline in the high frequency response characteristic due to the extended length of the magnetic path as described above, several specific means have already been disclosed. For example, in the U.S. Pat. No. 4,878,290 by Charles et al., a technique of manufacturing a thin film magnetic head having a two-layer configuration of the coil with the spiral structure has been disclosed. In accordance with the thin film magnetic head, the coil with two-layer configuration compromises a reduction in the thickness of the head at some degree, but sufficient turns of the coil can be obtained by the coil with the two-layer configuration, so that a sufficient amount of magnetic flux can be obtained, and the high frequency response characteristic can be improved. In addition to the above-described U.S. Pat. No. 4,878,290, another technique of manufacturing the thin film magnetic head having the coil with the two-layer configuration has been disclosed in the U.S. Pat. No. 5,255,142 by Edger et al.

In recent years, as a demand for the thin film magnetic head grows, it is required to improve the high frequency response characteristic, and the efficiency of the head by the improved integration scale of the coil, and to further reduce the time required for manufacturing the head. However, there is a problem that the conventional thin film magnetic head cannot fully satisfy the above requirements.

SUMMARY OF THE INVENTION

The present invention has been achieved in view of the above problems. It is an object of the invention to provide a thin film magnetic head capable of improving the high frequency response characteristic and the efficiency of the head and reducing the manufacturing time, and a method of manufacturing the thin film magnetic head.

A method of manufacturing a thin film magnetic head according to the invention includes two magnetic layers magnetically coupled to each other, and having two magnetic poles which face each other with a gap layer in between, and face a recording medium, a thin film coil including a first hierarchical pattern and a second hierarchical pattern, and an insulating layer for insulating the thin film coil from the two magnetic layers, the method comprising: a first step of forming a first precursory layer as a preparatory layer of the first hierarchical pattern; a second step of forming a separate precursory layer made of an insulating material on the first precursory layer; a third step of forming a second precursory layer as a preparatory layer of the second hierarchical pattern on the separate precursory layer; and a forth step of continuously patterning the second precursory layer, the separate precursory layer and the first precursory layer to selectively form the second hierarchical pattern, a separate layer and the first hierarchical pattern, in a batch process, the separate layer electrically isolating the first hierarchical pattern from the second hierarchical pattern.

A thin film magnetic head according a first aspect of the invention comprises two magnetic layers magnetically coupled to each other and having two magnetic poles which face each other with a gap layer in between and face a recording medium, a thin film coil extending between the two magnetic layers in the direction where the two magnetic layers extend, and having a spiral winding structure around a coupling position of the two magnetic layers, and an insulating layer for insulating the thin film coil from the two magnetic layers, and a first hierarchical pattern which is a part of the thin film coil, a separate layer made of an insulating material and a second hierarchical pattern which is coupled to the first hierarchical pattern and is another part of the thin film coil are laminated in this order, and the first hierarchical pattern, the separate layer and the second hierarchical pattern are disposed in the same position so as to fully overlap one another and have the same planar shape.

A thin film magnetic head according to a second aspect of the invention comprises two magnetic layers magnetically coupled to each other and having two magnetic poles which face each other with a gap layer in between and face a recording medium; a thin film coil having a first winding portion around one of the two magnetic layers, and a second winding portion, which is coupled to the first winding portion, around the other of the two magnetic layers, and an insulating layer for insulating the thin film coil from the two magnetic layers, and a first hierarchical pattern which is a part of the first winding portion, a separate layer made of an insulating material, a second hierarchical pattern which is coupled to the first hierarchical pattern and is a part of the second winding portion are laminated in this order, and the first hierarchical pattern, the separate layer and the second hierarchical pattern are disposed in the same position so as to fully overlap one another and have the same planar shape.

In the method of manufacturing a thin film magnetic head according to the invention, by continuously patterning the first precursory layer, the separate precursory layer and the second precursory layer, the first hierarchical pattern, the separate layer and the second hierarchical pattern are selectively formed in a batch process so as to be disposed in the same position so as to fully overlap one another and have the same planar shape. Thereby, the number of processes required for forming the thin film coil can be reduced compared with the case where the first and second hierarchical patterns are formed in separate processes.

In the thin film magnetic head according to the first and second aspects of the invention, the first hierarchical pattern, the separate layer and the second hierarchical pattern, which are disposed in the same position so as to fully overlap one another and have the same planar shape, are laminated in this order to form the thin film magnetic head. As the thin film magnetic head has the above-described configuration, the method of manufacturing the thin film magnetic head according to the invention is applicable for manufacturing the thin film magnetic head.

In the method of manufacturing a thin film magnetic head according to the invention, the forth step may include a process of forming a mask with a shape corresponding to a planar shape of the thin film coil on the second precursory layer, and an etching process of continuously etching the second precursory layer, the separate precursory layer and the first precursory layer with the use of the mask.

In the method of manufacturing a thin film magnetic head according to the invention, reactive ion etching is preferably used in the etching process. In this case, more specifically, it is preferable that an etching gas containing fluorine is used to etch the first and second precursory layers, and an etching gas containing chlorine is used to etch the separate precursory layer.

In the method of manufacturing a thin film magnetic head according to the invention, the first precursory layer, the separate precursory layer and the second precursory layer may be formed by sputtering.

In the thin film magnetic head according to the first and second aspects of the invention or the method of manufacturing the head, the insulating material used may be a material containing either aluminum oxide or silicon dioxide.

In the thin film magnetic head according to the first and second aspects of the invention or the method of manufacturing the thin film magnetic head, the separate precursory layer is preferably formed with a thickness from 10 nm to 50 nm inclusive.

Other and further objects, features and advantages of the invention will appear more fully from the following description.

BRIEF DESCRIPTION OF THE DRAWINGS

FIGS. 4A and 4B are cross-sectional views for explaining a process following the process shown in FIGS. 3A and 3B.

FIGS. 7A and 7B are cross-sectional views for explaining a process following the process shown in FIGS. 6A and 6B.

FIGS. 10A and 10B are cross-sectional views for explaining a process following the process shown in FIGS. 9A and 9B.

FIGS. 26A and 26B are cross-sectional views for explaining a process following the process shown in FIGS. 25A and 25B.

DETAILED DESCRIPTION OF THE PREFERRED EMBODIMENTS

Preferred embodiments of the present invention will be described in detail below with reference to the accompanying drawings.

[First Embodiment]

First, with reference to FIGS. 1A to 12A, FIGS. 1B to 12B, and FIGS. 13 to 19, a method of manufacturing a composite thin film magnetic head will be described as "a method of manufacturing a thin film magnetic head" according to a first embodiment of the invention. As a thin film magnetic head according to a first aspect of the invention is embodied by the method of manufacturing the thin film magnetic head according to the embodiment of the invention, the thin film magnetic head together with the method will be described as below.

Each of FIGS. 1A to 12A shows a cross-section perpendicular to an air bearing surface, and each of FIGS. 1B to 12B shows a cross-section of a magnetic pole tip portion parallel to the air bearing surface. Each of FIGS. 13 to 19 shows a planar structure corresponding to each of the main manufacturing processes. FIGS. 13, 14, 15, 16, 17, 18 and 19 correspond to states shown in FIGS. 1A and 1B, FIGS. 2A and 2B, FIGS. 3A and 3B, FIGS. 4A and 4B, FIGS. 7A and 7B, FIGS. 8A and 8B and FIGS. 9A and 9B, respectively. FIGS. 1A, 2A, 3A, 4A, 7A, 8A and 9A correspond to cross sections taken along the line A—A of FIGS. 13, 14, 15, 16, 17, 18 and 19, respectively.

In the following description, an X-axis direction, a Y-axis direction and a Z-axis direction in FIGS. 1A to 19 are expressed as "a width (or a width direction)", "a length (or a length direction)" and "a thickness (or a thickness direction)", respectively. The side close to an air bearing surface 20 (refer to FIGS. 12A and 12B, and FIG. 20 which will be described later) in the Y-axis direction (or the side where the air bearing surface 20 is formed in a later process) is expressed as "front (or frontward)", and the opposite side is expressed as "rear (or rearward)".

<Method of Manufacturing Thin Film Magnetic Head>

Figures 1A, 1B:
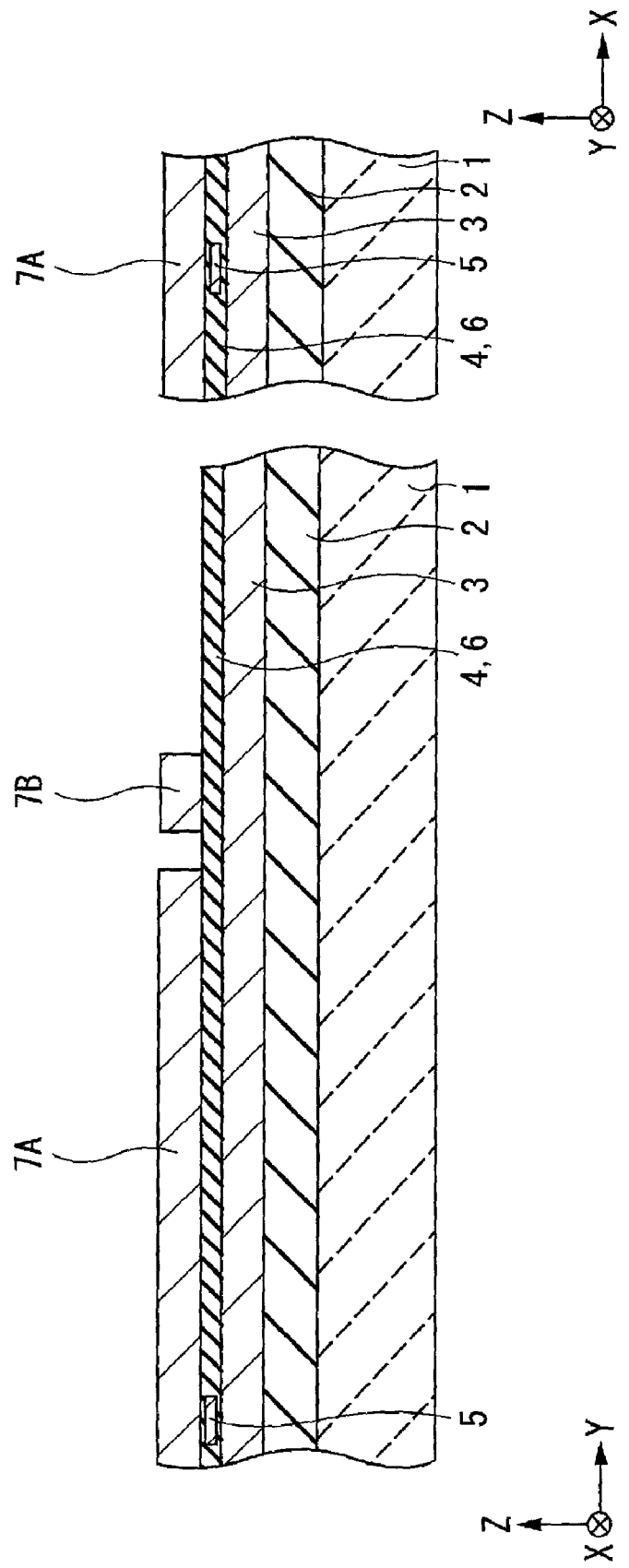
FIGS. 1A and 1B are cross-sectional views for explaining one process in a method of manufacturing a thin film magnetic head according to a first embodiment of the invention.

In the method of manufacturing the thin film magnetic head of the embodiment, at first, as shown in FIGS. 1A and 1B, an insulating layer 2 made of, for example, aluminum oxide ($Al_2O_3$; hereinafter simply referred to as "alumina") is deposited with a thickness of approximately 3.0 μm to 5.0 μm on a substrate 1 made of, for example, AlTiC ($Al_2O_3$—TiC). On the insulating layer 2, a bottom shield layer 3 made of, for example, nickel iron alloy (NiFe; hereinafter simply referred to as "Permalloy (trade name)") is selectively formed with a thickness of approximately 2.0 μm by, for example, plating which will be described later.

Next, as shown in FIGS. 1A and 1B, on the bottom shield layer 3, a shield gap film 4 made of, for example, alumina is formed with a thickness of approximately 0.01 μm to 0.1 μm by, for example, sputtering. On the shield gap film 4, a MR film 5 for constituting a MR element is formed into a desired pattern shape by high-accuracy photolithography. Then, by high-accuracy photolithography, a lead layer (not shown) as a lead electrode layer to be electrically connected to the MR film 5 is selectively formed. Then, a shield gap film 6 is formed so as to cover the MR film 5 by the use of the same technique as that for forming the shield gap film 4, thereby the MR film 5, etc. is embedded in the shield gap films 4 and 6.

Figure 13:
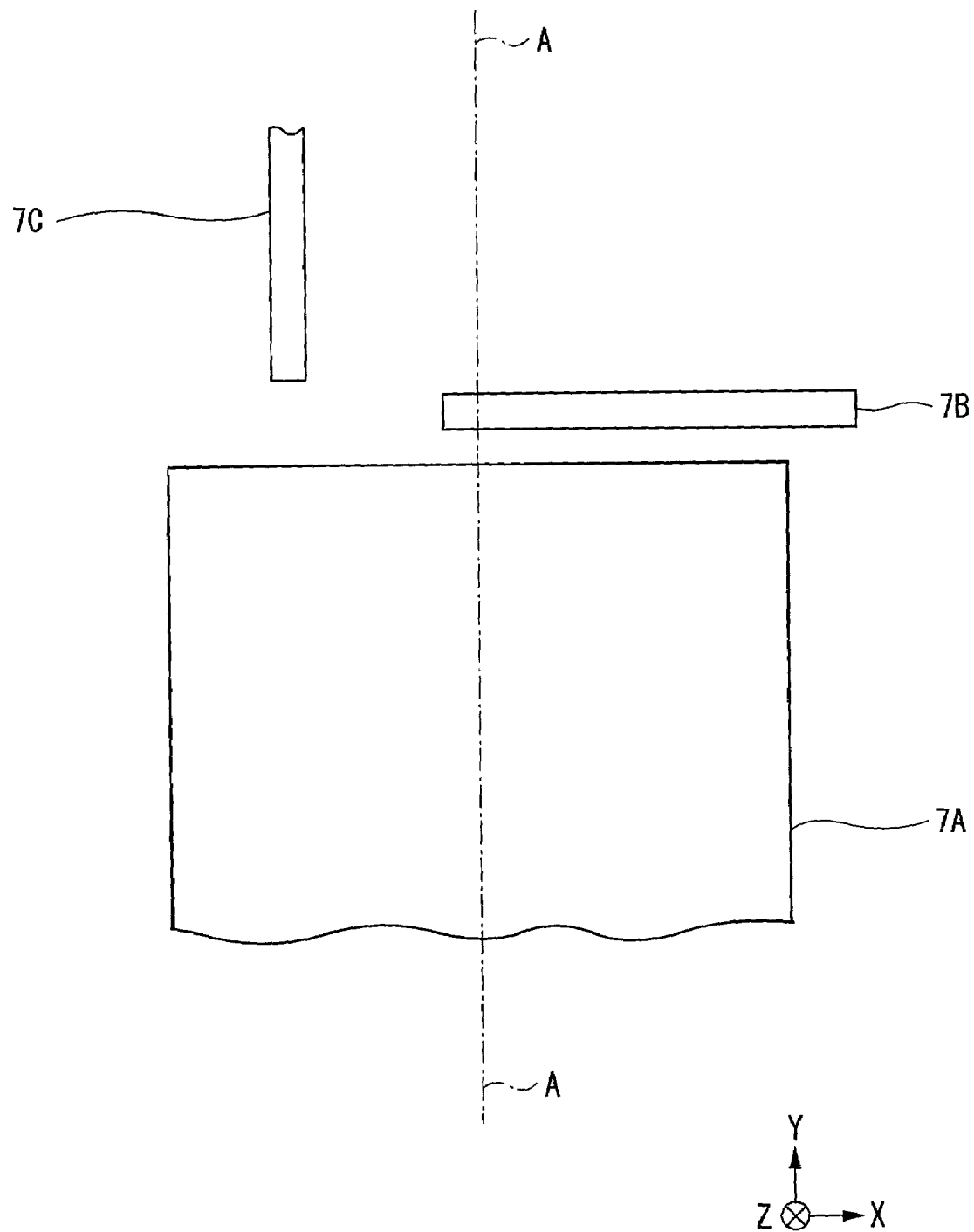
FIG. 13 is a plane view corresponding to the cross-sectional views shown in FIGS. 1A and 1B.

Next, as shown in FIGS. 1A, 1B and 13, on the front side of the shield gap film 4 and 6 (not shown in FIG. 13), by use of, for example, the same method and the same material for forming the bottom shield layer 3, a top shield layer-cum-bottom pole 7A (hereinafter simply referred to as "bottom pole") is selectively formed with a thickness of approximately 2.0 μm to 3.0 μm. At the same time that the bottom pole 7A is formed, for example, on predetermined positions in a region located at the rear of the region where the bottom pole 7A is formed, a connecting terminal 7B extending in the width direction is selectively formed and a connecting terminal 7C extending in the length direction is selectively formed so as to connect with an external circuit (not shown). The "predetermined positions" when forming the connecting terminals 7B and 7C indicates, for example, positions where an end of each of the connecting terminals 7B and 7C is to be connected with coil terminals 10AU and 10AS (refer to FIG. 17) of a coil pattern 10A which will be formed in a later process, respectively.

Figures 2A, 2B:
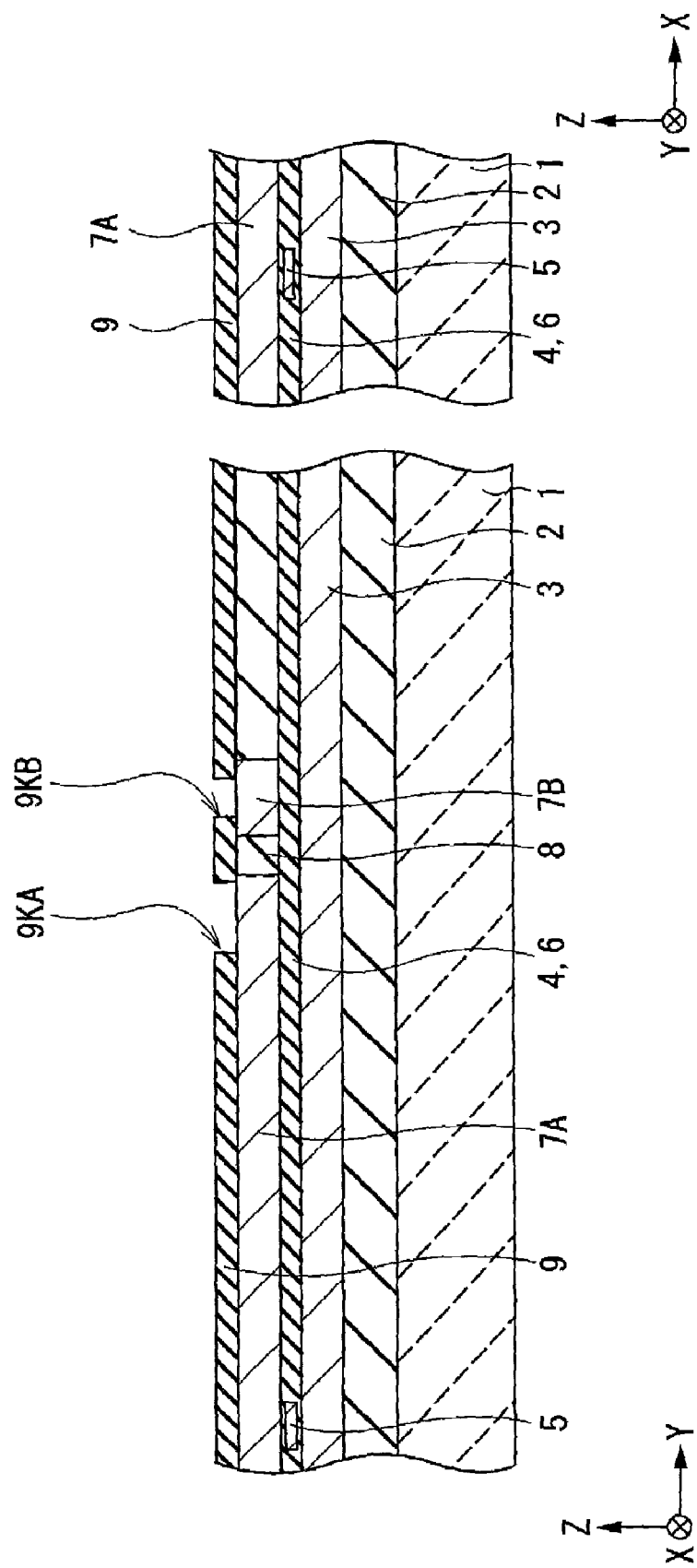
FIGS. 2A and 2B are cross-sectional views for explaining a process following the process shown in FIGS. 1A and 1B.

Next, as shown in FIGS. 2A and 2B, a region among the bottom pole 7A, and the connecting terminals 7B and 7C and their peripheral portions are filled with an insulating layer 8 made of, for example, alumina.

Figure 14:
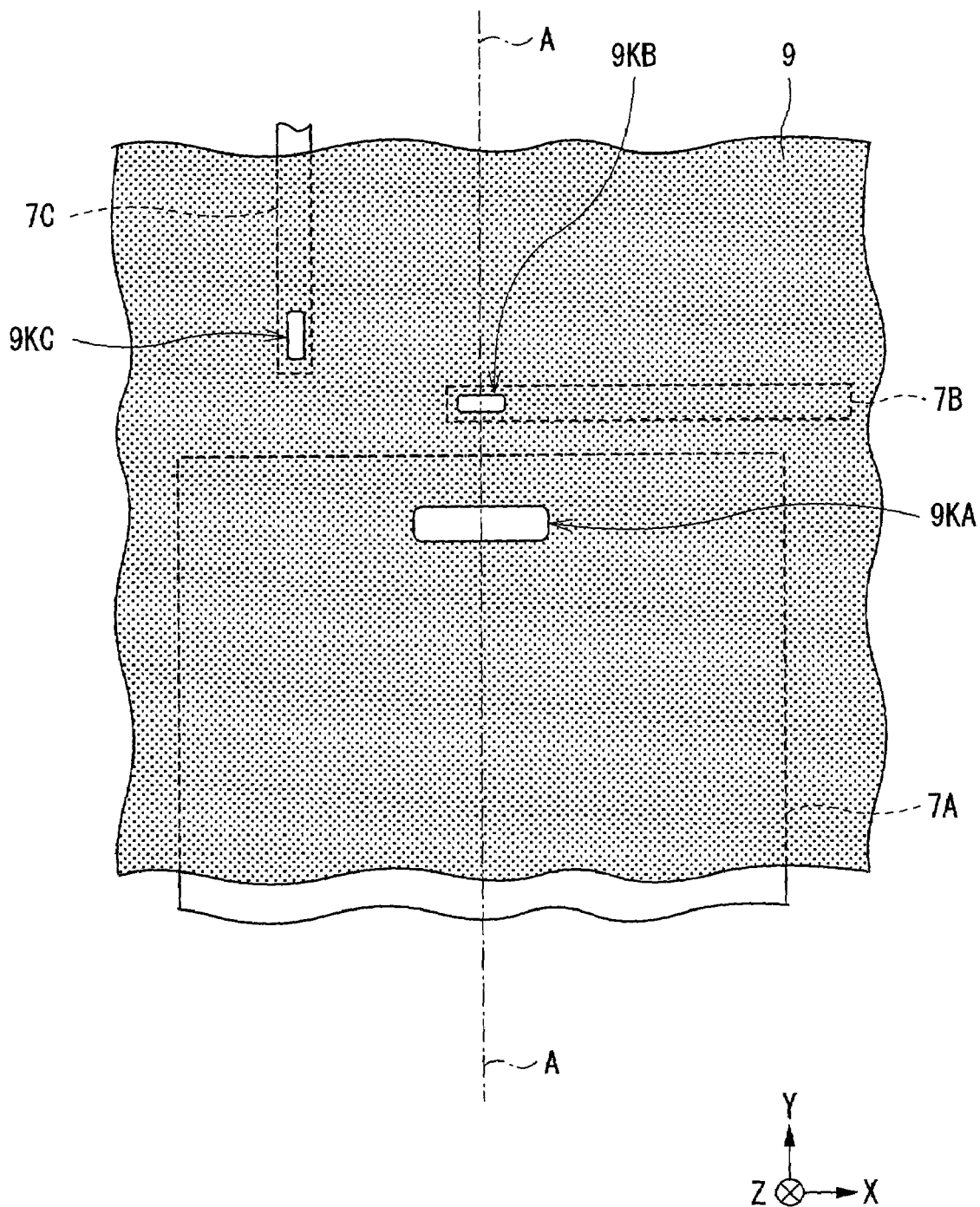
FIG. 14 is a plane view corresponding to the cross-sectional views shown in FIGS. 2A and 2B.

Next, as shown in FIGS. 2A, 2B and 14, a write gap layer 9 made of, for example, alumina is formed with a thickness of approximately 0.1 μm to 0.3 μm by, for example, sputtering. At the time when the write gap layer 9 is formed, an opening 9KA for connecting the bottom pole 7A with a top pole 13 which will be formed in a later process (refer to FIGS. 9A, 9B and 19), an opening 9KB for connecting the connecting terminal 7B with the coil pattern 10A (the coil terminal 10AU; refer to FIGS. 7A, 7B and 17) which will be formed in a later process, and an opening 9KC for connecting the connecting terminal 7C with the coil pattern 10A (the coil terminal 10AU; refer to FIGS. 7A, 7B and 17) which will be formed in the later process are formed, respectively. The write gap layer 9 corresponds to a specific example of a "gap layer" in the invention.

Figure 3A:
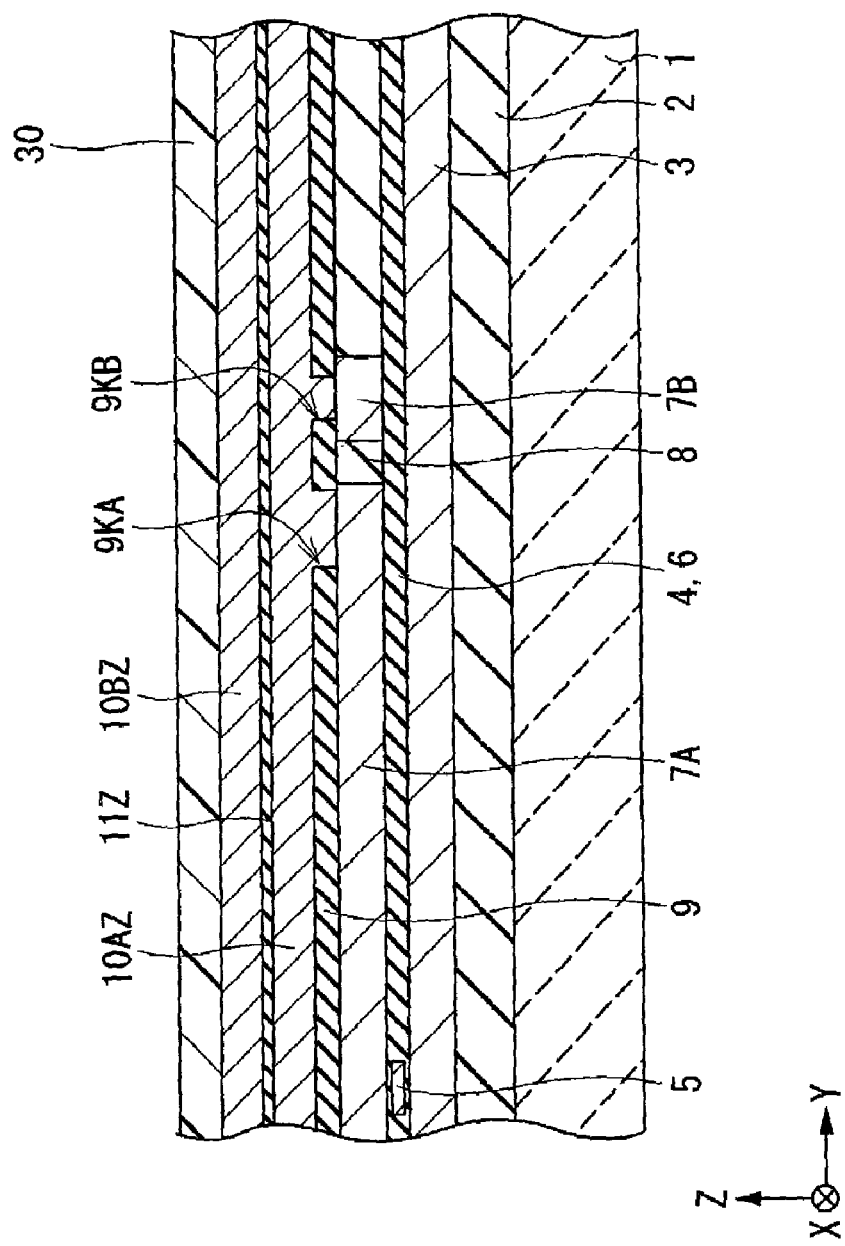
FIGS. 3A and 3B are cross-sectional views for explaining a process following the process shown in FIGS. 2A and 2B.
Figure 3B:
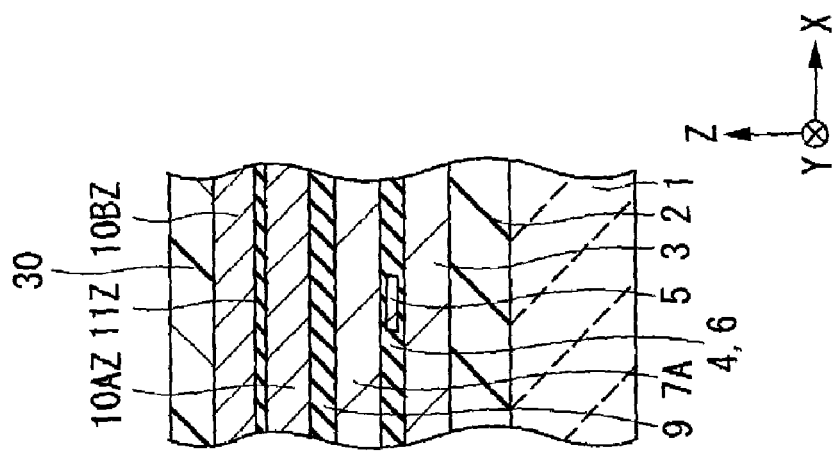
Figure 15:
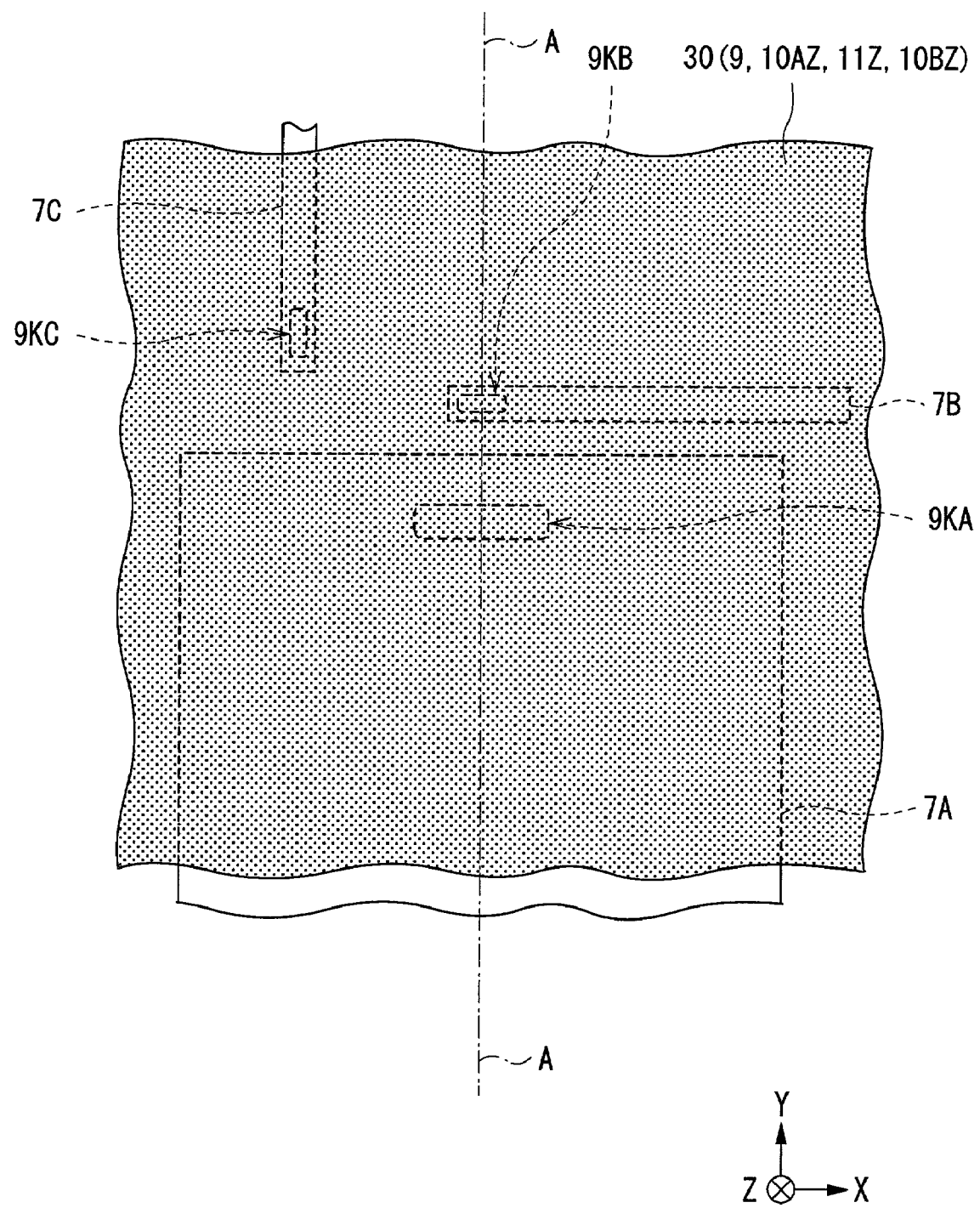
FIG. 15 is a plane view corresponding to the cross-sectional views shown in FIGS. 3A and 3B.

Next, as shown in FIGS. 3A, 3B and 15, a precursory layer 10AZ made of a metallic material such as copper (Cu), gold (Au) or aluminum (Al) is formed with a thickness of approximately 1.0 μm to 1.5 μm by, for example, sputtering so as to cover the whole. The precursory layer 10AZ is a preparatory layer which will be the coil pattern 10A (refer to FIGS. 7A, 7B and 17) by patterning in the later process. Like the precursory layer 10AZ, hereinafter a preparatory layer which will be formed into a predetermined shape in a later process by patterning is referred to as "a precursory layer". The precursory layer 10AZ corresponds to a specific example of a "first precursory layer" in the invention.

Next, as shown in FIGS. 3A, 3B and 15, a separate precursory layer 11Z made of an inorganic insulating material such as alumina or silicon dioxide ($SiO_2$) is formed with a thickness of approximately 10 nm to 50 nm by, for example, sputtering so as to cover the precursory layer 10AZ. Then, by use of, for example, the same method and the same material for forming the precursory layer 10AZ, a precursory layer 10BZ is formed with a thickness of approximately 1.0 μm to 1.5 μm so as to cover the separate precursory layer 11Z. The precursory layer 10BZ corresponds to a specific example of a "second precursory layer" in the invention.

Next, as shown in FIGS. 3A, 3B and 15, a photoresist is coated on the surface of the precursory layer 10BZ to form a photoresist film 30. For the photoresist film 30, either of a negative or positive photoresist can be used.

Figure 16:
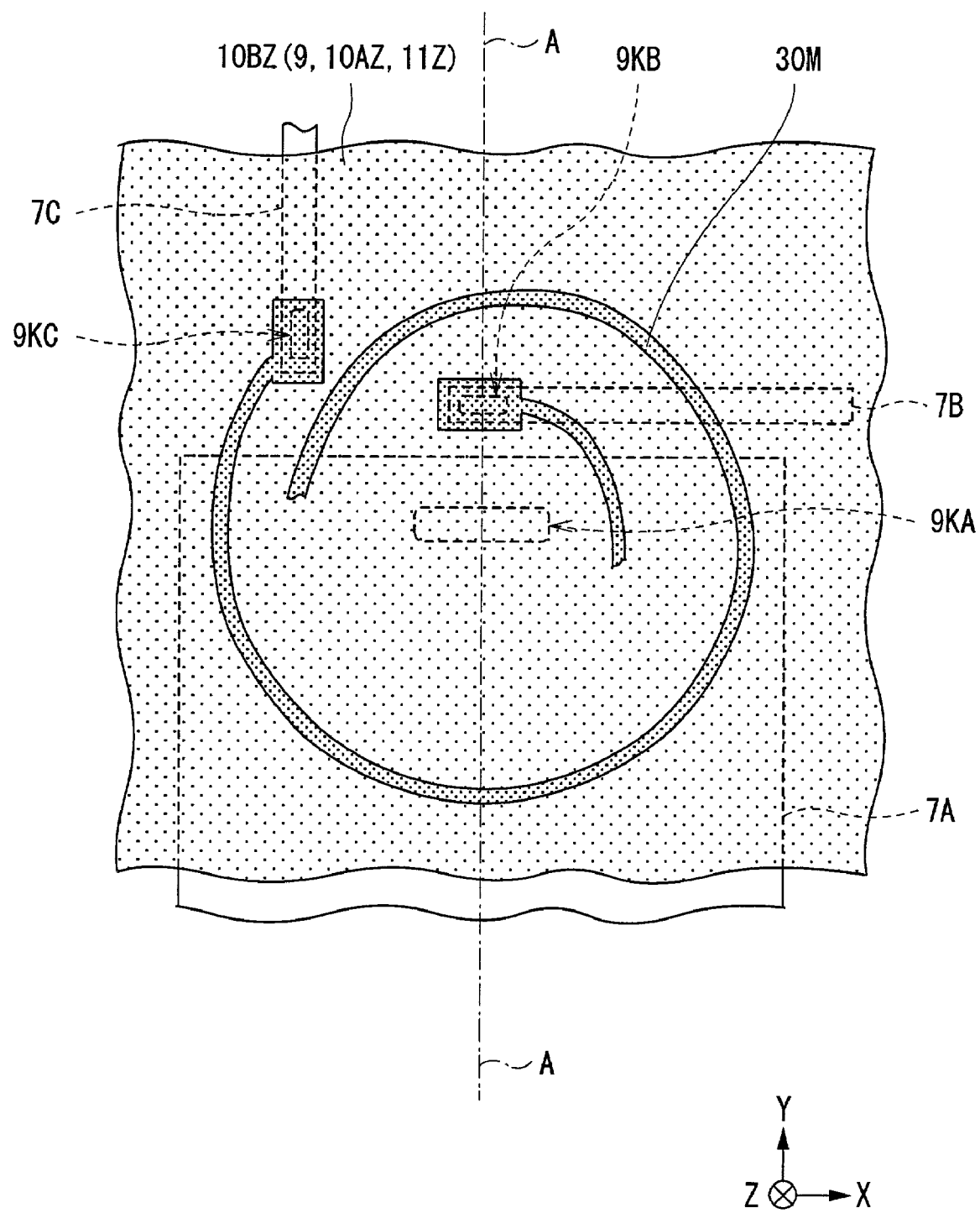
FIG. 16 is a plane view corresponding to the cross-sectional views shown in FIGS. 4A and 4B.

Next, as shown in FIGS. 4A, 4B and 16, the photoresist film 30 is selectively patterned by high-accuracy photolithography to selectively form a mask 30M with a spiral winding structure corresponding to planar shapes of the coil pattern 10A (including coil terminals 10AU and 10AS), a separate layer 11 and a coil pattern 10B (including coil terminals 10BU and 10BS; refer to FIGS. 7A, 7B and 17) which will be formed in a later process. In FIGS. 4A and 16, only a part of the winding structure of the mask 30M is illustrated.

Figures 5A, 5B:
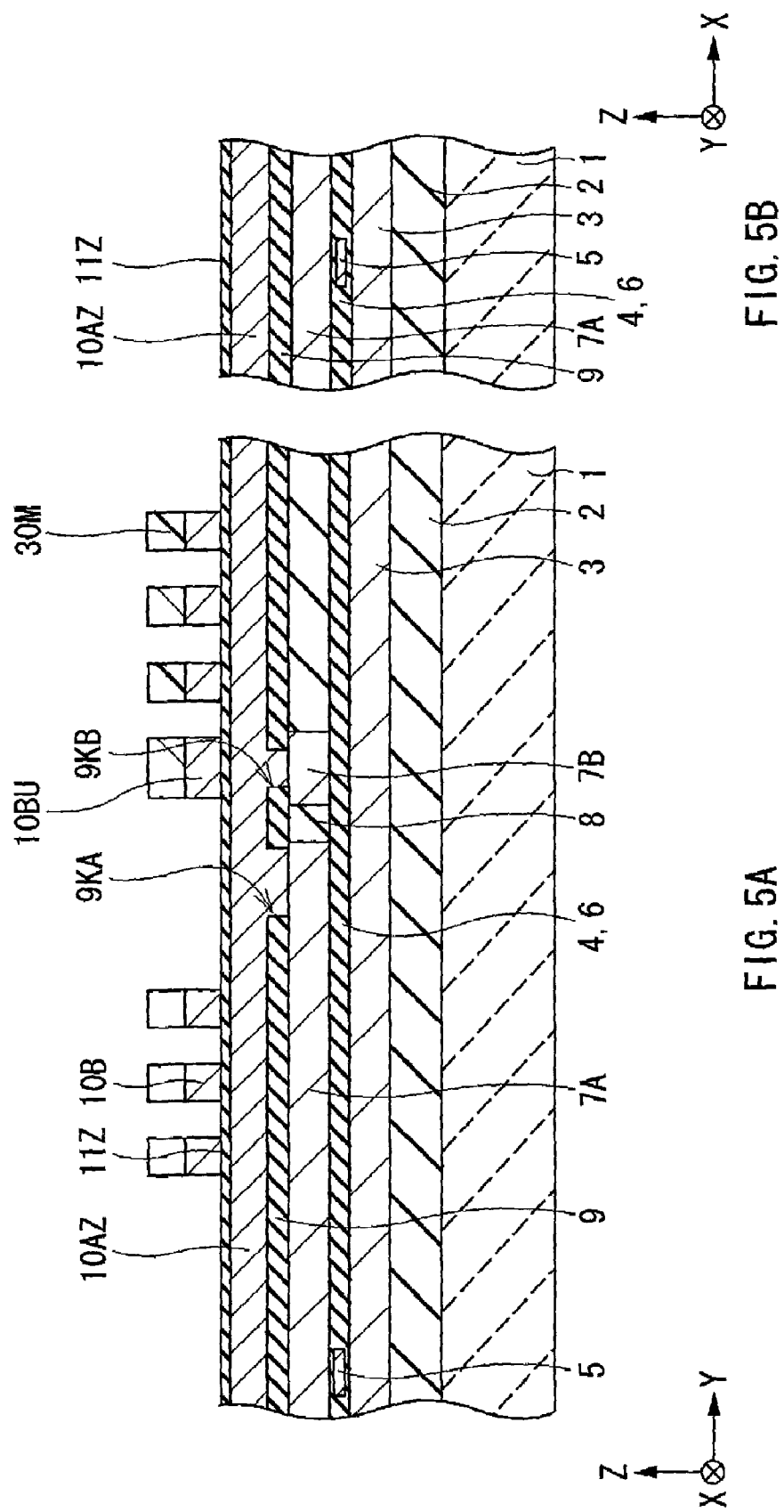
FIGS. 5A and 5B are cross-sectional views for explaining a process following the process shown in FIGS. 4A and 4B.

Next, with using the mask 30M, by, for example, reactive ion etching (RIE), the precursory layer 10BZ is selectively etched. Thereby, as shown in FIGS. 5A and 5B, as a remaining part of the precursory layer 10BZ in the etching process, the coil pattern 10B with the spiral winding structure corresponding to the shape of the mask 30M is selectively formed, and the coil terminal 10BU as an internal end and the coil terminal 10BS as an external end are integrally formed together with the coil pattern 10B (refer to FIG. 17 which will be described later). When the etching process using RIE is carried out on the precursory layer 10BZ, for example, an etching gas containing fluorine is specifically used. By using the etching gas containing fluorine, a chemical reaction at the time of etching the precursory layer 10BZ made of copper or the like is accelerated, so the etching process can be completed in a shorter time. The coil pattern 10B corresponds to an example of a "second hierarchical pattern" in the invention.

Figures 6A, 6B:
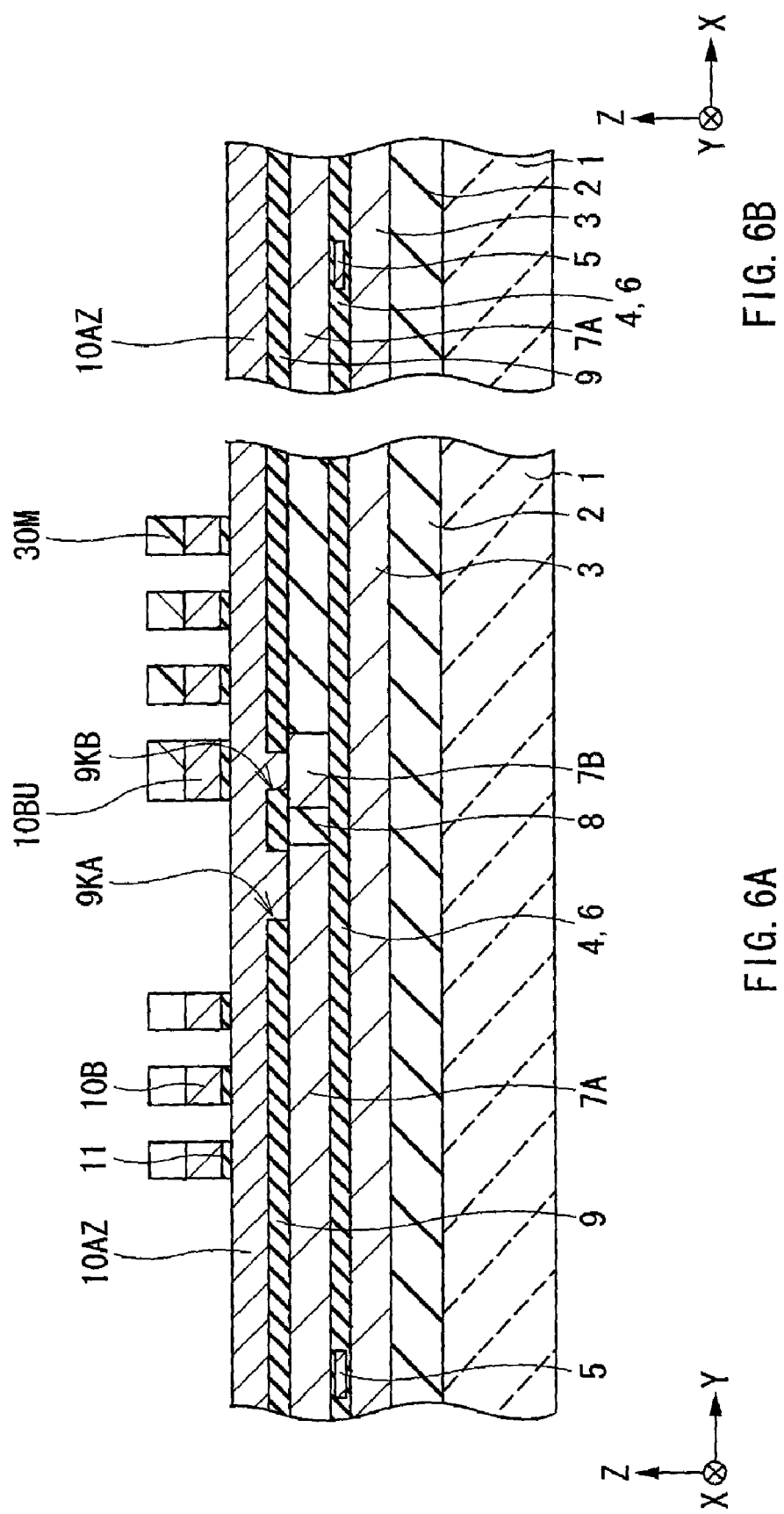
FIGS. 6A and 6B are cross-sectional views for explaining a process following the process shown in FIGS. 5A and 5B.

Next, with continuously using the mask 30M, the separate precursory layer 11Z is selectively etched by, for example, RIE to selectively form a separate layer 11 with the same planar shape as the coil pattern 10B as shown in FIGS. 6A and 6B for electrically separating the coil pattern 10B from the coil pattern 10A (refer to FIGS. 7A, 7B and 17) which will be formed in the later process. When performing the etching process using RIE on the separate precursory layer 11Z, for example, an etching gas containing chlorine is specifically used. By using the a etching gas containing chlorine, a chemical reaction at the time of etching the separate precursory layer 11Z made of alumina or the like is accelerated, so the etching process can be completed in a shorter time.

Figure 17:
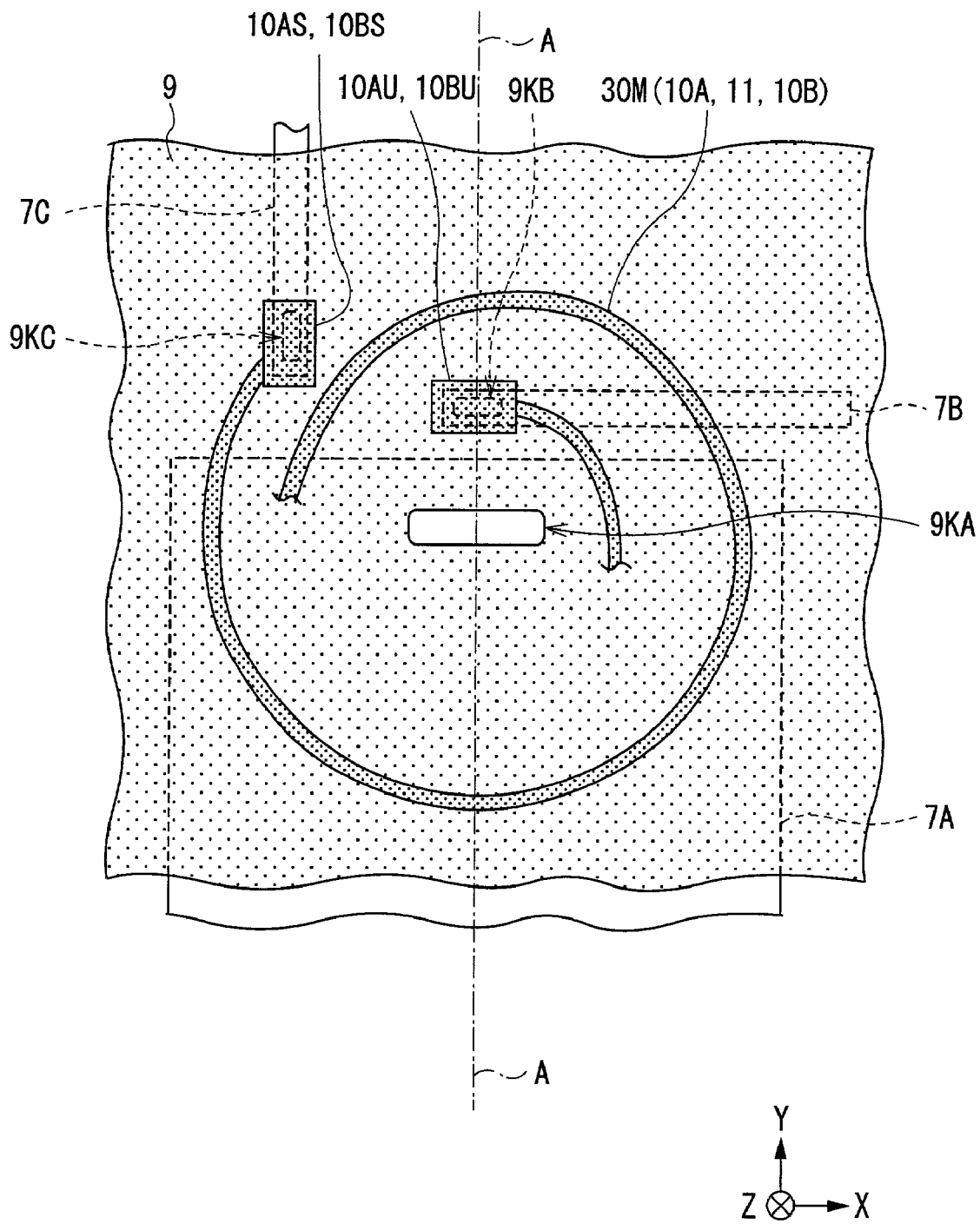
FIG. 17 is a plane view corresponding to the cross-sectional views shown in FIGS. 7A and 7B.

Next, with continuously using the mask 30M, for example, the precursory layer by using the same etching process and conditions as those used on the precursory layer 10BZ, the precursory layer 10AZ is selectively etched by RIE. Thereby, as shown in FIGS. 7A, 7B and 17, the coil pattern 10A with the same planar shape as the coil pattern 10B is selectively formed, and the coil terminal 10AU as an internal end and the coil terminal 10AS as an external end are integrally formed together with the coil pattern 10A. In the coil pattern 10A, the coil terminal 10AU is connected to the connecting terminal 7B through the opening a KB, while the coil terminal 10AS is connected to the connecting terminal 7C through the opening 9KC. When performing the etching process to form the coil pattern 10A, the bottom pole 7A is exposed in the opening 9KA. The coil pattern 10A corresponds to an example of a "first hierarchical pattern" in the invention.

Figures 8A, 8B:
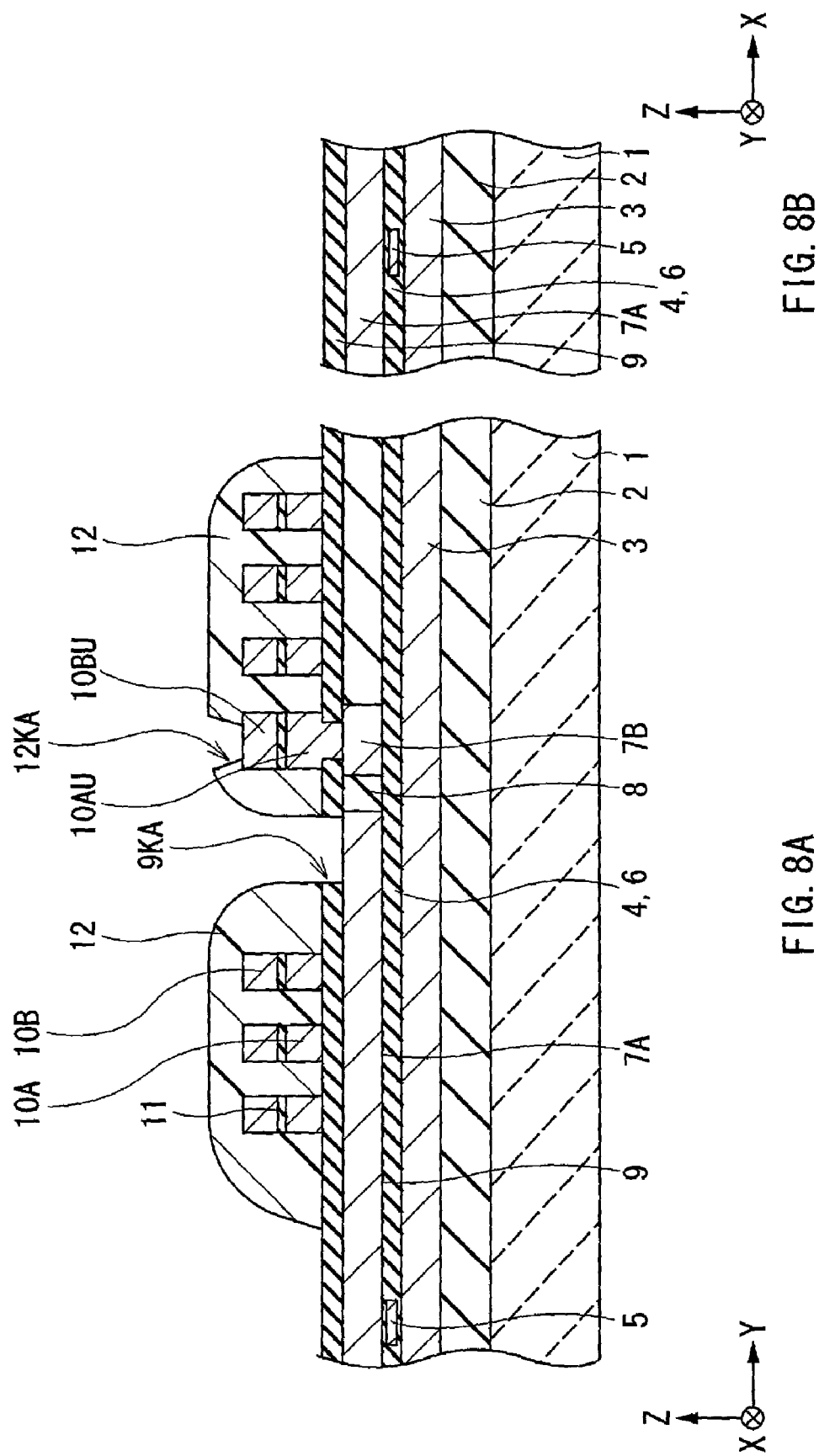
FIGS. 8A and 8B are cross-sectional views for explaining a process following the process shown in FIGS. 7A and 7B.
Figure 18:
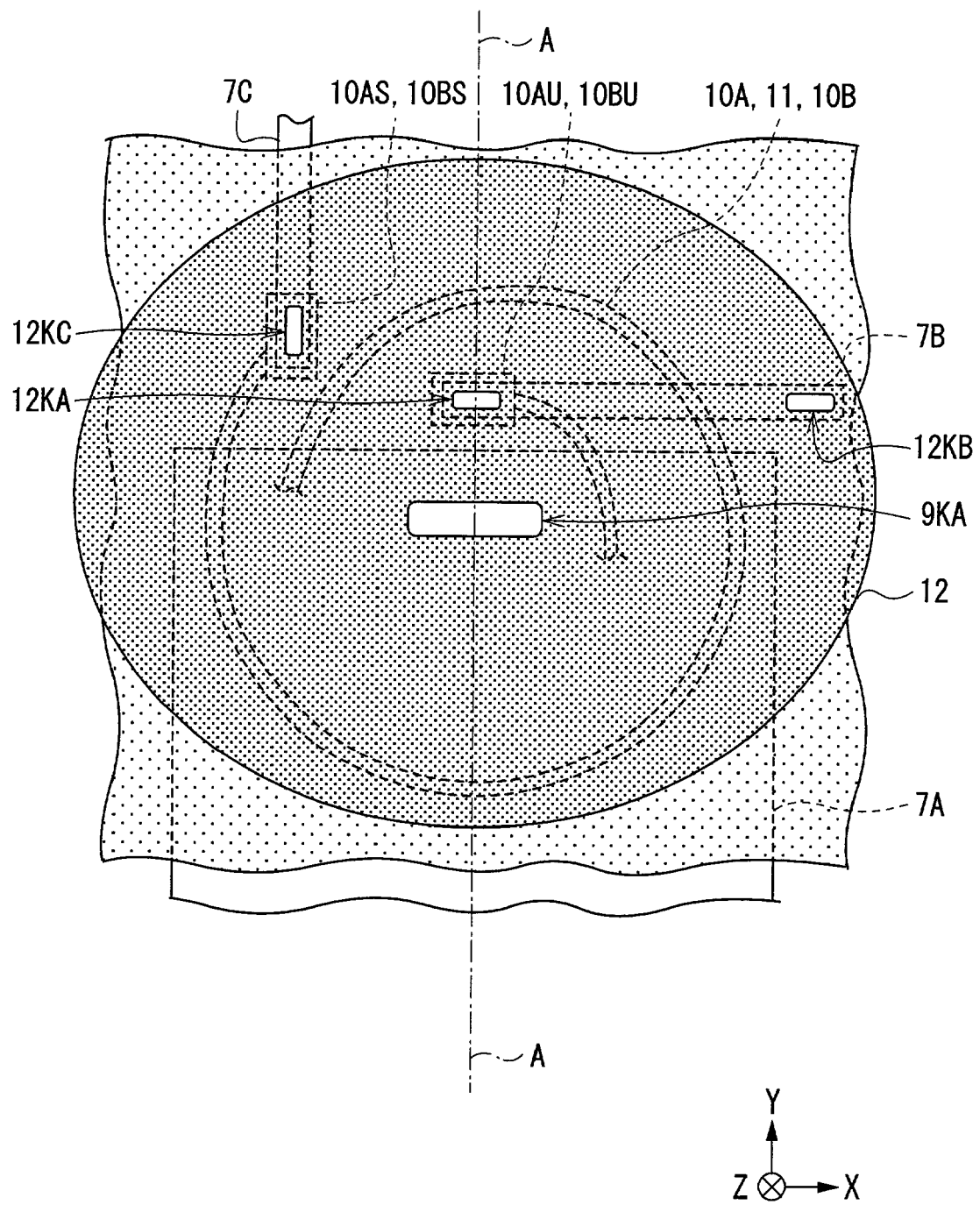
FIG. 18 is a plane view corresponding to the cross-sectional views shown in FIGS. 8A and 8B.

Next, a material having fluidity at heating, for example, an organic insulating material such as a photoresist is coated on the coil pattern 10A, separate layer 11, coil pattern 10B and their peripheral regions so as to selectively form a photoresist film. Then, by performing a heating process at a temperature of approximately 200° C. to 250° C. on the photoresist film, as shown in FIGS. 8A, 8B and 18, the photoresist flows and fills up between each turn of the windings of the coil patterns 10A and 10B without space, so as to form an insulating layer 12 for electrically insulating the thin film coil 10 from its periphery. The surface of the insulating layer 12 in regions near edges is formed into a rounded slope corresponding to a flow of the photoresist. The insulating layer 12 is formed so as not to cover the opening 9KA formed in the write gap layer 9 in the foregoing process. The insulating layer 12 corresponds to an example of an "insulating layer" in the invention.

Next, by, for example, ion milling, parts of the insulating layer 12, the parts corresponding to the coil terminals 10BU and 10BS in the coil pattern 10B and a distal end portion from the coil terminal 10BU in the connecting terminal 7B, are selectively etched so as to form openings 12KA, 12KC and 12KB, respectively, as shown in FIGS. 8A, 8B and 18.

Figures 9A, 9B:
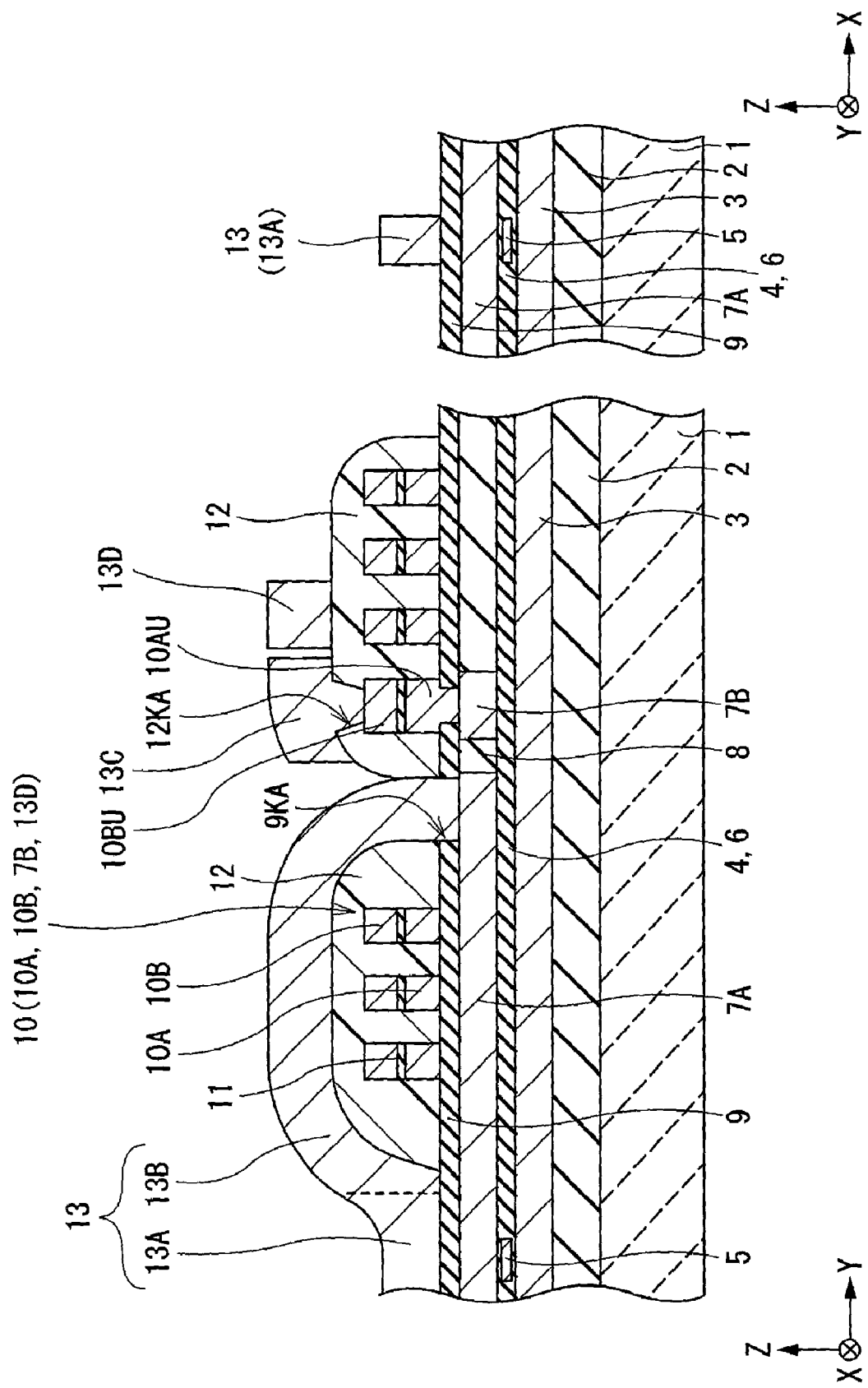
FIGS. 9A and 9B are cross-sectional views for explaining a process following the process shown in FIGS. 8A and 8B.
Figure 19:
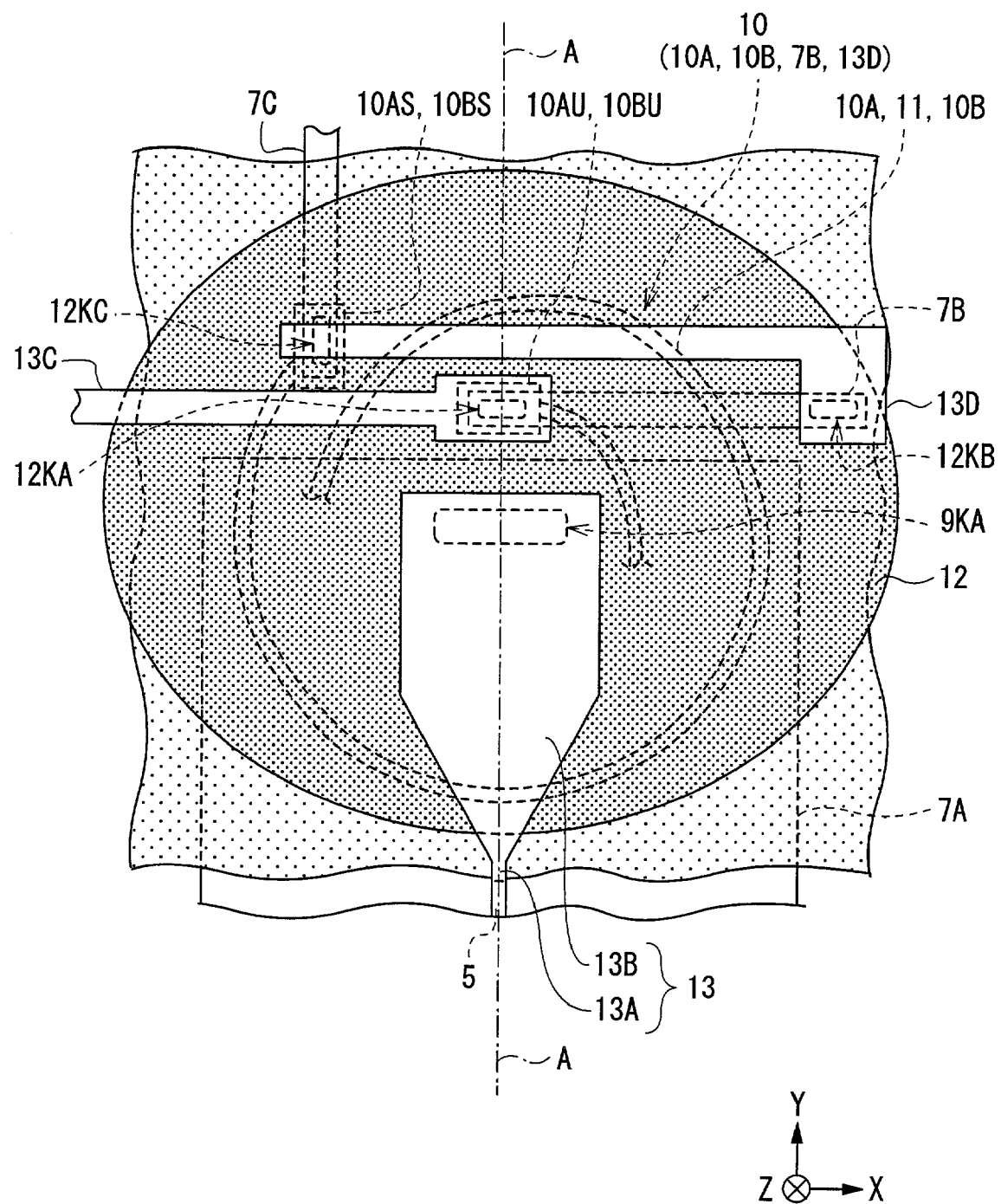
FIG. 19 is a plane view corresponding to the cross-sectional views shown in FIGS. 9A and 9B.

Next, as shown in FIGS. 9A, 9B and 19, the top pole 13 made of, for example, Permalloy is selectively formed with a thickness of approximately 2.0 μm to 3.0 μm by, for example, plating so as to cover the insulating layer 12 in a range from the write gap layer 9 at the side which will become the air bearing surface 20 in the later process (on the left side of the drawing) to an exposed surface of the bottom pole 7A in the opening 9KA. At the same time that the top pole 13 is formed, for example, a connecting terminal 13C extending in the width direction from an exposed surface of the coil terminal 10BU in the opening 12KA to an external circuit (not shown) is selectively formed, and a connecting terminal 13D extending in the width direction from an exposed surface of the connecting terminal 7B in the opening 12KB to an exposed surface of the connecting terminal 7C in the opening 12KC is selectively formed. Thereby, the coil pattern 10A is connected to the coil pattern 10B through the connecting terminals 13A, 13B, 13C and 13D so as to form the thin film coil 10. The connection state of the thin film coil 10 will be described in detail hereinafter (refer to FIG. 21). The top pole 13 is formed so as to include, for example, a tip portion 13A and a yoke portion 13B in order from the side which will become the air bearing surface 20 in the later process, and so that the tip portion 13A has a very minute uniform width (for example, approximately 0.3 µm) which defines the write track width. The top pole 13 is magnetically coupled with the bottom pole 7A in the opening 9KA, so that a propagation path of magnetic flux, that is, a magnetic path is formed by the bottom pole 7A and the top pole 13.

The top pole 13 is formed by plating as follows. At first, an electrode film, which will be a seed layer in an electro plating process, is formed by, for example, sputtering on a surface of a base (such as the insulating layer 12) on which the top pole 13 is to be formed. As a material of the electrode film, for example, the same material as that of the top pole 13 (such as Permalloy) is used. Then, a photo resist is coated on the electrode film to form a photo resist film, and then the photo resist film is patterned by high-accuracy photolithography to form a frame pattern for forming the top pole 13. With using the frame pattern as a mask, and by using the electrode film which has been formed in the foregoing process as a seed layer, Permalloy is grown by electro plating to form the top pole 13. Finally, after forming the top pole 13, the frame pattern is removed. The method of forming the connecting terminals 13C and 13D is the same as that of forming the top pole 13.

Next, with using the tip portion 13A of the top pole 13 as a mask, by, for example, ion milling or RIE, the write gap layer 9 and the bottom pole 7A in a region peripheral to the tip portion 13A is etched to remove approximately 0.5 µm thereof in self-alignment. Thus, as shown in FIGS. 10A and 10B, a pole tip portion 100 having a trim structure is formed. The pole tip portion 100 comprises the tip portion 13A of the top pole 13, a part of the bottom pole 7A corresponding to the tip portion 13A and a part of the write gap layer 9 sandwiched between the tip portion 13A and the part of the bottom pole 7A, each of which has almost the same uniform width.

Figures 11A, 11B:
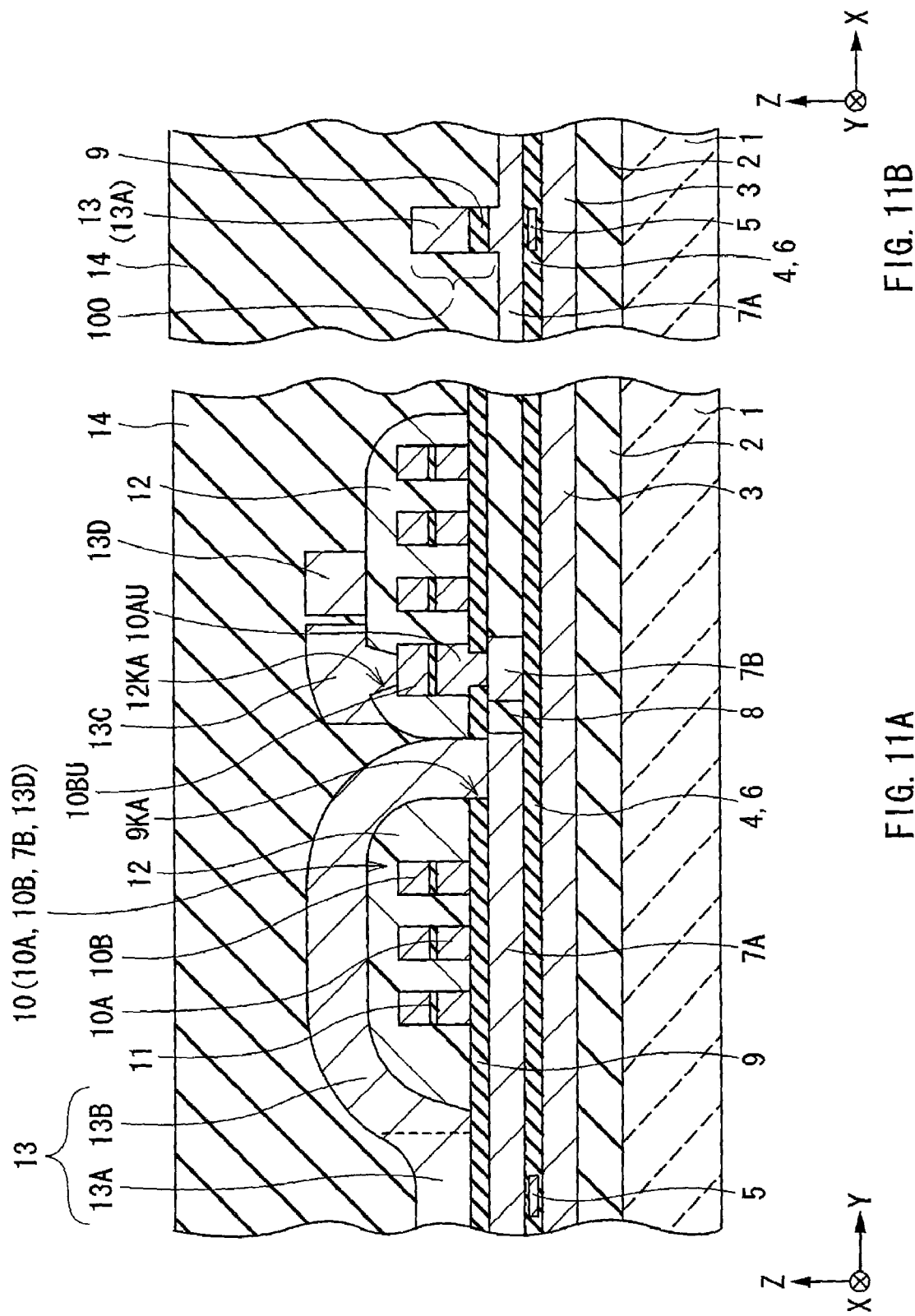
FIGS. 11A and 11B are cross-sectional views for explaining a process following the process shown in FIGS. 10A and 10B.

As shown in FIGS. 11A and 11B, an overcoat layer 14 made of an insulating material, for example, an inorganic insulating material such as alumina is formed with a thickness of approximately 20 µm to 40 µm so as to cover the whole.

Figures 12A, 12B:
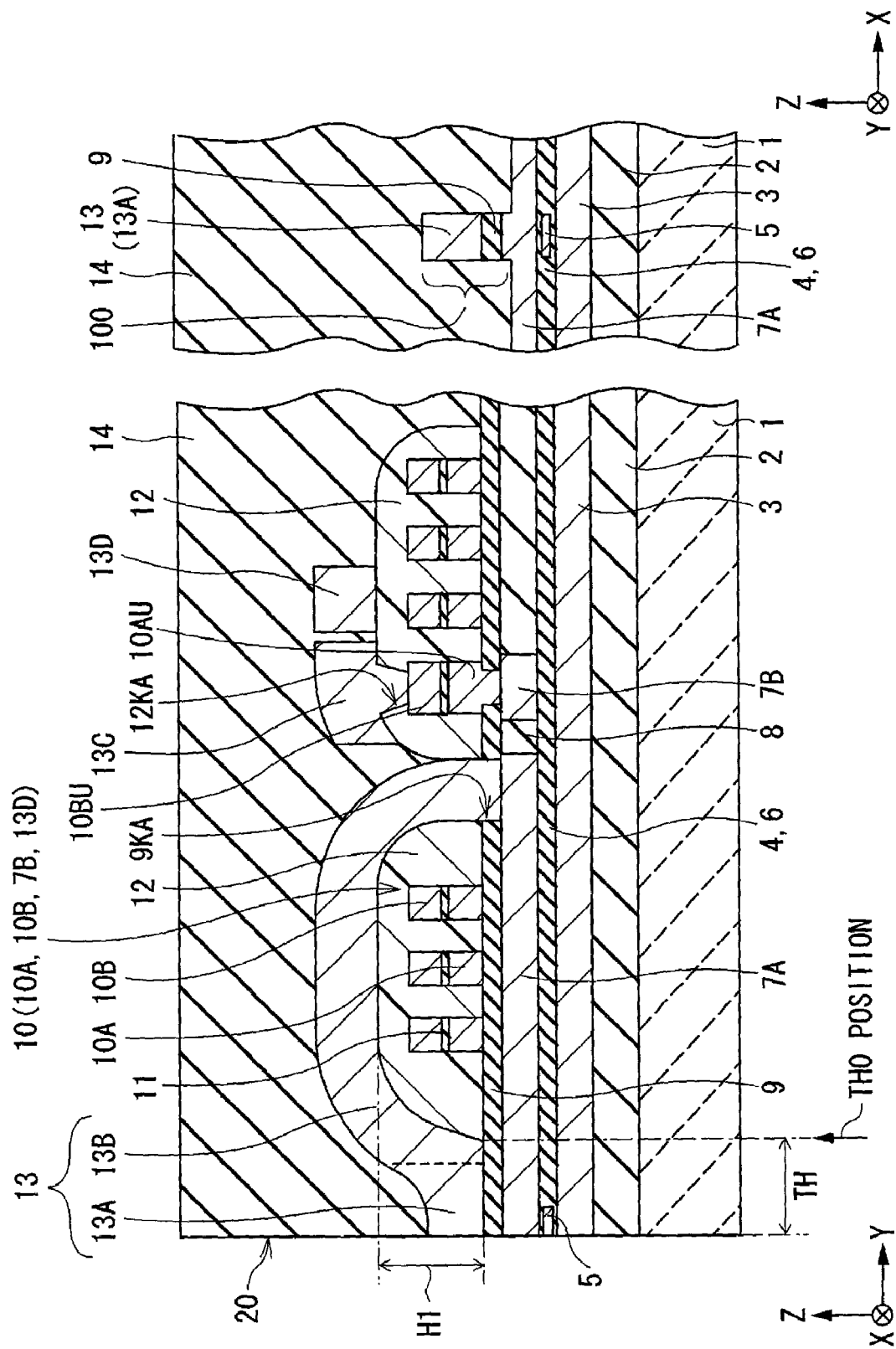
FIGS. 12A and 12B are cross-sectional views for explaining a process following the process shown in FIGS. 11A and 11B.

Finally, as shown in FIGS. 12A and 12B, the air bearing surface 20 of the recording head and reproducing head is formed by mechanical processing and polishing to complete the thin film magnetic head.

<Configuration of Thin Film Magnetic Head>

Figure 20:
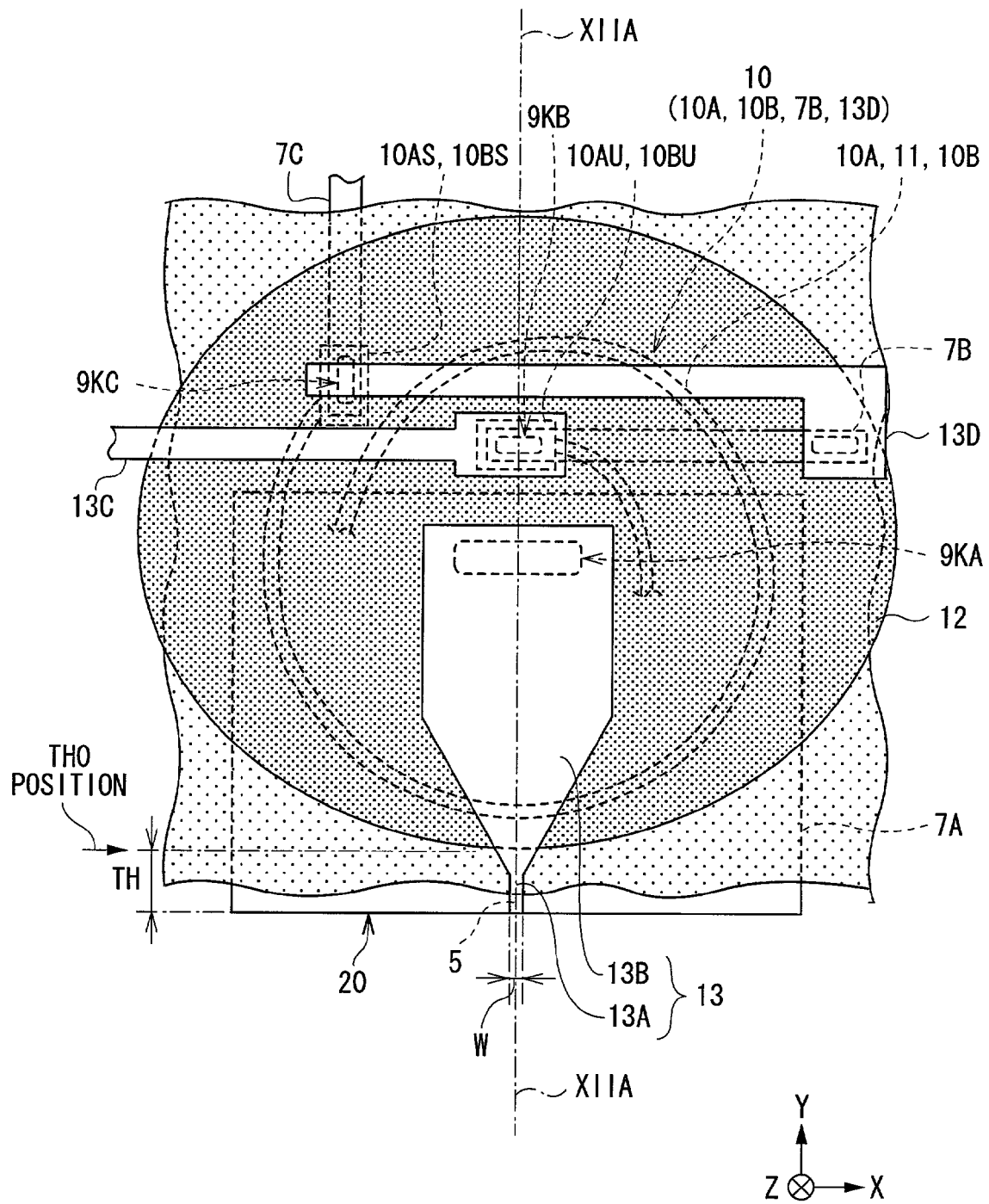
FIG. 20 is a plane view showing a plane structure of the thin film magnetic head according to the first embodiment of the invention.
Figure 21:
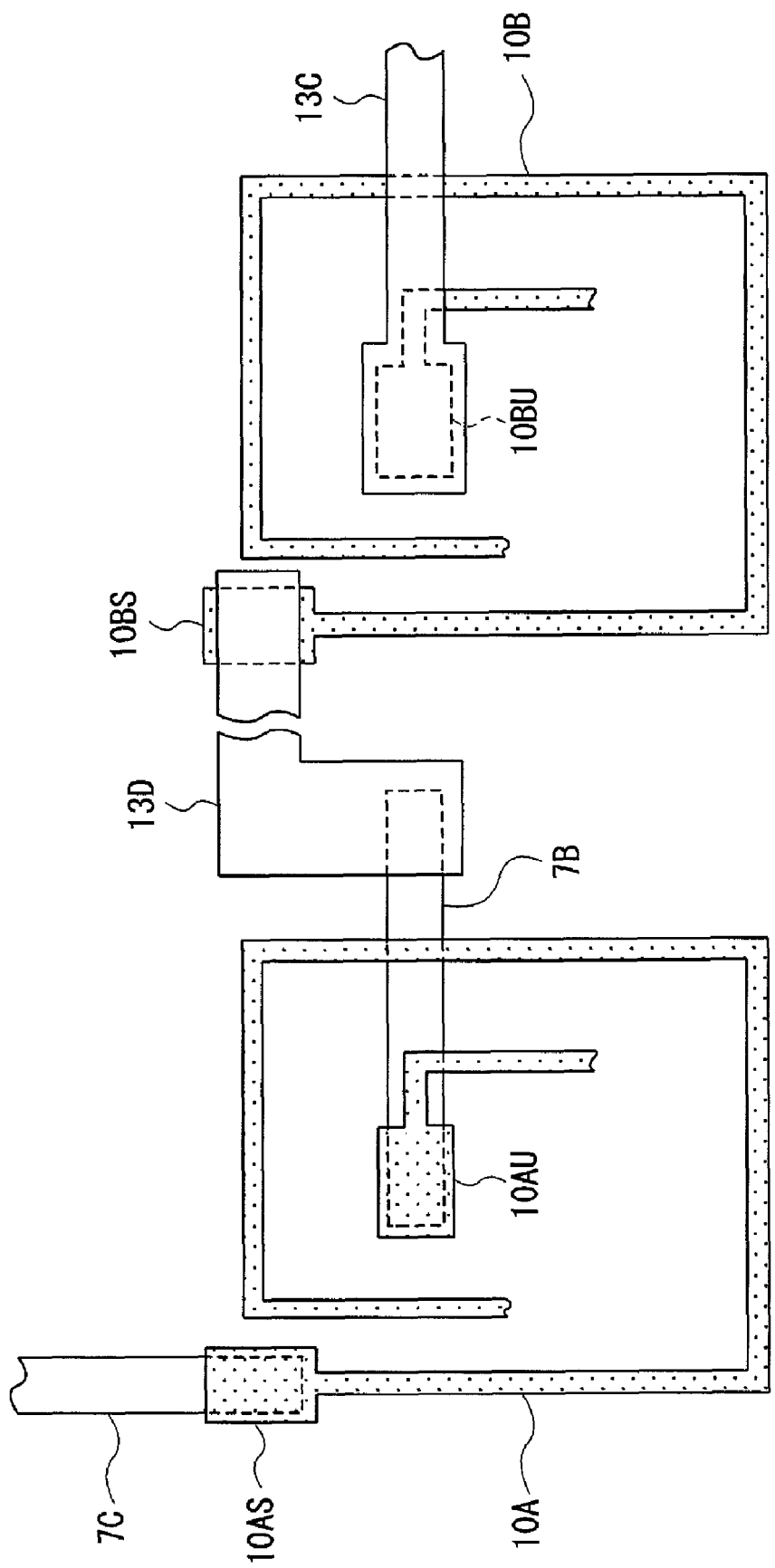
FIG. 21 is a plane view for explaining the connection state of a thin film coil in the thin film magnetic head according to the first embodiment of the invention.

With reference to FIGS. 12A, 12B, 20 and 21, the configuration of the thin film magnetic head according to the embodiment will be described hereinafter. FIG. 20 shows a plane structure of the thin film magnetic head which is manufactured by the method of manufacturing the thin film magnetic head according to the embodiment of the invention, while FIG. 21 schematically shows a connection state of the thin film coil 10. Each of FIGS. 12A and 12B corresponds to a cross section taken along the line XIIA—XIIA in FIG. 20.

As shown in FIGS. 12A, 12B and 20, the position of the front end of the insulating layer 12 is a reference position for determining a throat height (TH) which is one of the factors for determining the performance of the recording head, that is, a throat height zero position (TH0 position). The throat height (TH) is specified as a length from the position (TH0 position) of the front end of the insulating layer 12 to the air bearing surface 20.

As described above, the top pole 13 comprises, for example, the tip portion 13A having a very minute uniform width W, which defines the write track width, and the yoke portion 13B, which is magnetically coupled with the tip portion 13A and contains the magnetic flux generated by the thin film coil 10 in order from the air bearing surface 20. The tip portion 13A has, for example, a rectangular planar shape. The width of the yoke portion 13B is wider than the width W of the tip portion 13A, and for example, the rear part of the yoke portion 13B has an almost uniform width, and the width in the front part of the yoke portion 13 gradually gets narrow as the air bearing surface 20 comes near. The bottom pole 7A has, for example, a rectangular planar shape.

As described above, the thin film coil 10 comprises the coil patterns 10A and 10B having the same planar shapes and the connecting terminal 13D for connecting between the coil patterns 10A and 10B. As shown in FIGS. 12A, 12B, 20 and 21, the coil terminal 10AS of the coil pattern 10A is connected to an end of the connecting terminal 7C, while the coil terminal 10AU is connected to an end of the connecting terminal 7B. On the other hand, the coil terminal 10BU of the coil pattern 10B is connected to an end of the connecting terminal 13C, while the coil terminal 10BS is connected to an end of the connecting terminal 13D. The other end of the connecting terminal 7B is connected to the other end of the connecting terminal 13D, so that the coil patterns 10A and 10B constitute a current path through the connecting terminals 7B, 7C, 13A, 13B and 13C. By an external circuit (not shown) connected to each of the other ends of the connecting terminals 7C and 13C, the thin film coil 10 (the coil patterns 10A, 10B and the connecting terminal 13D) can be energized.

<Operations of the Thin Film Magnetic Head>

With Reference to FIGS. 12A, 12B, 20 and 21, the operations of the thin film magnetic head according to the embodiment of the invention will be described hereinafter.

In the thin film magnetic head, during recording information, when a current flows through the thin film coil 10, for example, from the connecting terminal 7C to the connecting terminal 13C via the external circuit (not shown), a magnetic flux will be generated in a direction propagating from the bottom pole 7A to the top pole 13 in response to the current flow. The magnetic flux generated by the thin film coil 10 propagates through the magnetic path from the bottom pole 7A to the top pole 13 (the tip portion 13A), and finally reaches the tip part of the tip portion 13A at the side of the air bearing surface 20. By the magnetic flux which has reached the tip part of the tip portion 13A, a signal magnetic field for recording is generated on an external portion peripheral to the write gap layer 9. By the signal magnetic field, a magnetic recording medium is partially magnetized to record information.

On the other hand, during reproducing information, a sense current flows through the MR film 5. The resistance in the MR film 5 varies with a reproducing signal magnetic field from the magnetic recording medium, so by detecting a change in the resistance with a change in the sense current, the information recorded in the magnetic recording medium can be read out.

<Actions and Effects of the Embodiment>

With reference to FIGS. 3A to 7B, 22A, 22B and 23, actions and effects of the embodiment will be described hereinafter.

Figures 22A, 22B:
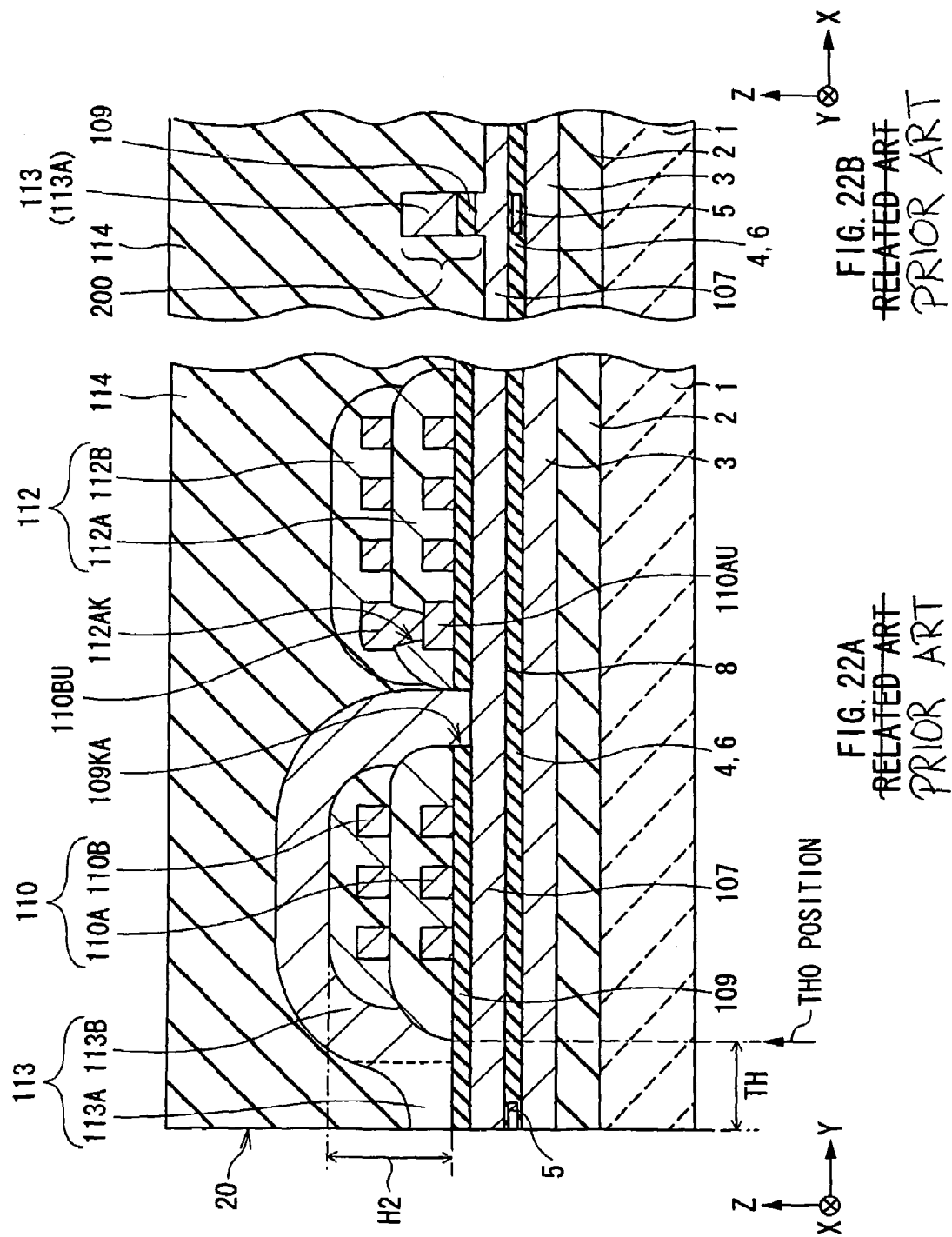
FIGS. 22A and 22B are cross-sectional views showing a cross-section structure of a thin film magnetic head as a comparison with respect to the thin film magnetic head according to the first embodiment of the invention.
Figure 23:
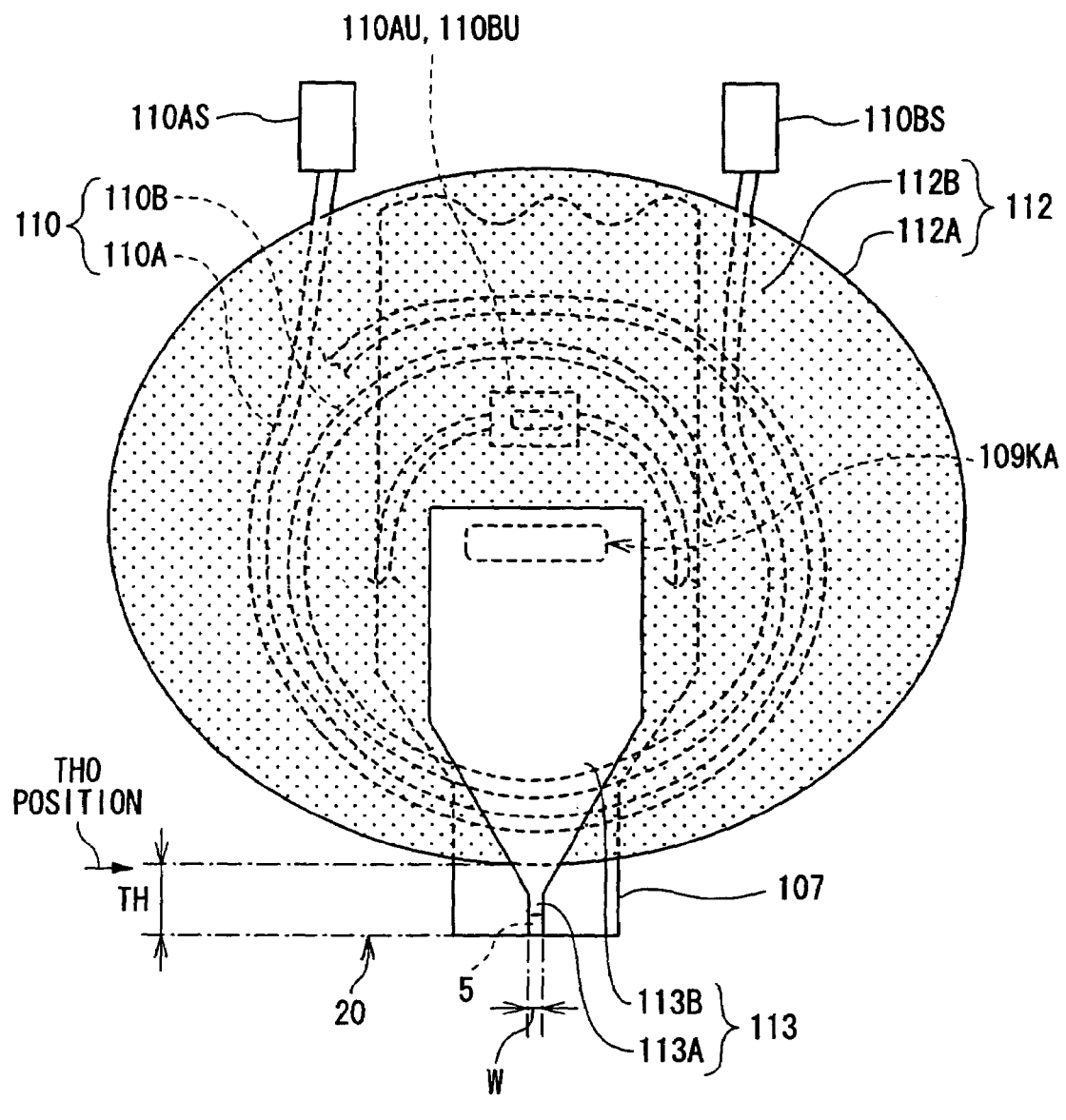
FIG. 23 is a plane view of the thin film magnetic head as the comparison shown in FIGS. 22A and 22B.

Each of FIGS. 22A and 22B shows a cross-section of a thin film magnetic head as a comparison with the thin film magnetic head according to the embodiment, and correspond to FIGS. 12A and 12B, respectively. FIG. 23 shows a plane structure of the thin film magnetic head as the comparison shown in FIGS. 22A and 22B, and corresponds to FIG. 20. Each of FIGS. 22A, 22B and 23 show a head structure comprising a coil patterns 110A and 110B (a thin film coil 110) with, for example, spiral structures in opposite directions, which are filled with insulating layers 112A and 112B (112) made of a photo resist, respectively. Internal ends (coil terminal 110AU and 110BU) of the coil patterns 110A and 110B are connected to each other through an opening 112AK in the insulating layer 112A, while external ends (coil terminals 110AS and 110BS) thereof are connected to an external circuit (not shown). Turns of the thin film coil 110 are the same turns of the thin film coil 10 (the coil pattern 10A: 3 turns+the coil pattern 10B: 3 turns=6 turns) according to the embodiment.

In the embodiment, after laminating the precursory layer 10AZ, the separate precursory layer 11Z and the precursory layer 10BZ, these layers are continuously patterned by etching to form the coil pattern 10A, separate layer 11 and coil pattern 10B in a batch process, so the time required to manufacture the thin film magnetic head can be reduced because of the following reasons.

That is, in order to reduce the time to manufacture the thin film magnetic head, for example, it is required to reduce the number of manufacturing processes of forming each component constituting the thin film magnetic head. In the comparison (refer to FIGS. 22A, 22B and 23), by a two-layer structure of a coil with the spiral structure, enough turns of the coil for generating an adequate magnetic flux can be obtained, although in terms of manufacturing technique, it is difficult to form the thin film coil 110 (the coil patterns 110A and 110B) with spiral structures in the opposite directions in the same process, so it is required to form the coil patterns 110A and 110B in separate processes. In this case, when the coil patterns 110A and 110B are formed in, for example, two separate plating processes, two separate processes of photolithography (formation of frame patterns, etc.), which is mentioned when describing the formation of the top pole 13 in the above "method of manufacturing the thin film magnetic head", are required, so it takes much time to manufacture the thin film coil 110.

On the other hand, in the embodiment, as shown in FIGS. 3A to 7B, with using the mask 30M, the precursory layer 10AZ, the separate precursory layer 11Z and precursory layer 10BZ are continuously patterned by RIE to form the coil pattern 10A, the separate layer 11 and the coil pattern 10B in a batch process. Therefore, unlike the comparison that two separate lithography processes are required to form the thin film coil 110, only one photolithography process is required to form the mask 30M, so the number of processes to manufacture the thin film coil 10 in the embodiment is fewer than that in the comparison (the number of processes to manufacture the thin film coil 110). Further, the connecting terminals 7B and 7C which are connected to the coil patterns 10A and 10B are formed in the same process of forming the bottom pole 7A, and the connecting terminals 13C and 13D are formed in the same process of forming the top pole 13, so no separate manufacturing process to form these connecting terminals (7B, 7C, 13C and 13D) is required. Therefore, in the embodiment, the thin film coil 10 having the two-layer structure allows enough amount of magnetic flux generation to be ensured, and allows the time for manufacturing the thin film coil 10 to be reduced, thereby the time for manufacturing the thin film magnetic head can be reduced. Moreover, the time for manufacturing the thin film magnetic head according to the embodiment can be further reduced than that using the manufacturing techniques disclosed in the U.S. Pat. No. 4,878,290 or U.S. Pat. No. 5,255,142 described in "Description of the Related Art".

Further, in the embodiment, as means for patterning to form the coil pattern 10A, the separate layer 11 and the coil pattern 10B, RIE of which etching speed is relatively high is used, so the etching process can be completed in a shorter time compared with any other means for patterning such as ion milling. In this point of view, the embodiment contributes reduced time for manufacturing the thin film magnetic head.

Further, in the embodiment, as the material of the separate layer 11, an inorganic insulating material such as alumina is used, and as a method of forming the separate layer 11, sputtering is used. Therefore, unlike the comparison where a photo resist is used as the material of the insulating layer 112A and heat treatment is used as the method of forming the insulating layer 112A, the thickness of the separate layer 11 for electrically insulating between the coil patterns 10A and 10B can be more strictly controlled to form the separate layer 11 with a thinner thickness (approximately 10 nm to 50 nm). In this case, in the thin film magnetic head (refer to FIGS. 12A and 12B) according to the embodiment, the height H1 of the insulating layer 12 with which the thin film coil 10 is filled is shorter than the height H2 of the insulating layer 112 (112A and 112B) with which the thin film coil 110 is filled. Therefore, in the embodiment, the length of the magnetic path becomes shorter due to a decrease in the height H1, so the high frequency response characteristic in the thin film magnetic head can be improved.

Moreover, in the embodiment, with decreasing thickness of the separate layer 11 as described above, a distance between the coil patterns 10A and 10B becomes closer to be capable of forming the thin film coil 10 in a narrower space. Therefore, by the improved scale of integration of the thin film coil 10, the efficiency of the head can be improved, and the thin film magnetic head as a whole can be thinner.

Further, in the embodiment, especially during etching by RIE, the precursory layers 10AZ and 10BZ made of metallic materials are patterned with using the etching gas containing fluorine, and the separate precursory layer 11Z is patterned with using the etching gas containing chlorine, so that the chemical reaction during etching can be accelerated according to materials to be etched. Therefore, the etching process can be completed in a shorter time, and consequently the time for manufacturing the thin film magnetic head can be reduced.

Moreover, in the embodiment, the height H1 of the insulating layer 12 becomes shorter, so the pole tip portion 100 can be formed with high accuracy so as to have a very minute uniform width because of the following reasons. That is, when the top pole 13 is formed by plating on a base including a hilly portion (apex portion) consisting of the insulating layer 12, the formation accuracy of the top pole 13 depends on the height H1 of the apex portion, because in the forming process of a frame pattern for forming the top pole 13, when a exposure process is performed on a photo resist film formed on the base including the apex portion, reflective light which reflects from the surface of the electrode film formed on a front slope part of the apex portion to a slanting direction or a cross direction is generated, and by the effect of the reflective light, the exposure region in the photo resist film is expanded or reduced, resulting in a decline in the formation accuracy of the frame pattern. In the embodiment, by the shorter height H1 of the insulating layer 12, the slope of the apex portion becomes gentler, and the amount of reflective light generation, which adversely affects the formation accuracy of the frame pattern, is reduced. Therefore, a part of the frame pattern corresponding to the tip portion of the top pole 13 is formed with high accuracy. Thereby, the top pole 13 (tip portion 13A) can be formed with high accuracy so as to have a very minute uniform width, and the pole tip portion 100 can be formed with high accuracy like the top pole 13.

Figure 24:
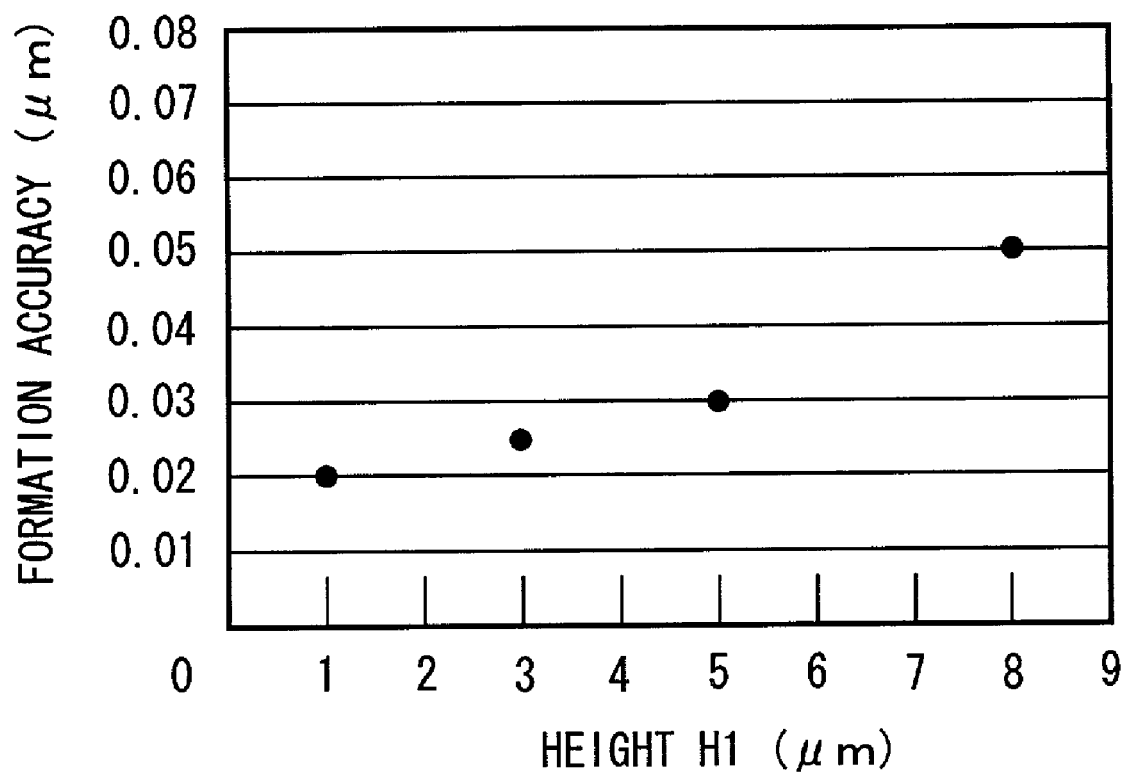
FIG. 24 is a graph showing a correlation between the height of an insulating layer and the formation accuracy of a tip portion.

This is also evident from experimental results on the formation accuracy of the top pole 13 (tip portion 13A) shown in FIG. 24. FIG. 24 shows a graph of a correlation between the height H1 of the insulating layer 12 and the formation accuracy of a tip portion 13A. The lateral axis in the graph indicates height H1 ($\mu$m) and the vertical axis indicates absolute value ($\mu$m) of a difference from an expected width (0.3 $\mu$m) (i.e., a deviation between an actual width and an expected width) of the tip portion 13A. As shown in FIG. 24, the smaller the height H1, the smaller the absolute value of the tolerance becomes, and thereby, the formation accuracy of the tip portion 13A can be improved.

<Modification of the Embodiment>

In the embodiment, RIE is used as means for patterning to form the coil pattern 10A, the separate layer 11 and the coil pattern 10B, the means is not necessarily limited to this, and any other means for patterning such as ion milling may be used. Even in this case, the same effect as in the above embodiment can be obtained. However, as described above, the etching speed of ion milling is slower than that of RIE, so if consideration is given to the reduction of time for manufacturing the thin film magnetic head, RIE is preferably used as the means for patterning.

Further, in the embodiment, sputtering is used as means for forming the precursory layer 10AZ, the separate precursory layer 11Z and the precursory layer 10BZ, but the means is not necessarily limited to this, and any other means such as plating or CVD (chemical vapor deposition) may be used.

Still further, in the embodiment, a photo resist film is used as a material of the mask 30M which is used in the patterning process of the precursory layer 10AZ, the separate precursory layer 11Z and the precursory layer 10BZ. However, in the embodiment, the material is not necessarily limited to this, but the material of the mask 30M can be freely modified to any material which can ensure the function as the mask 30M during etching. More specifically, as the material of the mask 30M, an inorganic material such as alumina which is harder than the photo resist may be used. When alumina is used as the material of the mask 30M, unlike the case where the softer photo resist is used, the erosion of the mask 30M during etching can be prevented.

[Second Embodiment]

Next, a second embodiment of the invention will be described hereinafter.

In a method of manufacturing the thin film magnetic head according to the second embodiment of the invention, unlike the first embodiment that the thin film coil 10 with the spiral structure is formed, a thin film coil with a "toroidal structure", in which one coil is continuously wound around the top pole and the bottom pole, is formed.

<Method of Manufacturing the Thin Film Magnetic Head>

First, with reference to FIGS. 25A to 31A, FIGS. 25B to 31B, FIGS. 32 to 38, a method of manufacturing a composite thin film magnetic head will be described as a method of manufacturing the thin film magnetic head according to the second embodiment of the invention. As a thin film magnetic head according to a second aspect of the invention is embodied by the method of manufacturing the thin film magnetic head according to the embodiment of the invention, the thin film magnetic head together with the method will be described as below. Each of FIGS. 25A to 31A shows a cross-section perpendicular to an air bearing surface, and each of FIGS. 25B to 31B shows a cross-section of a magnetic pole tip portion parallel to the air bearing surface. Each of FIGS. 32 to 38 shows a plane structure corresponding to each of the main manufacturing processes, and corresponds to each of FIGS. 25A to 31A and each of FIGS. 25B to 31B, respectively. FIGS. 25A to 31A correspond to cross-sections taken along the line B—B of FIGS. 32 to 38, respectively. In each of FIGS. 25A to 38, the expressions of a X-axis direction, a Y-axis direction and a Z-axis direction are the same as those in the first embodiment, and the same parts or elements are denoted by the same reference numerals as of the first embodiment throughout the drawings.

In the method of manufacturing the thin film magnetic head according to the embodiment of the invention (refer to FIGS. 25A and 25B), the processes from the beginning to filling the MR film 5 with the shield gap films 4 and 6 are the same as those in the first embodiment (refer to FIGS. 1A and 1B), so these processes will not further explained.

Figures 25A, 25B:
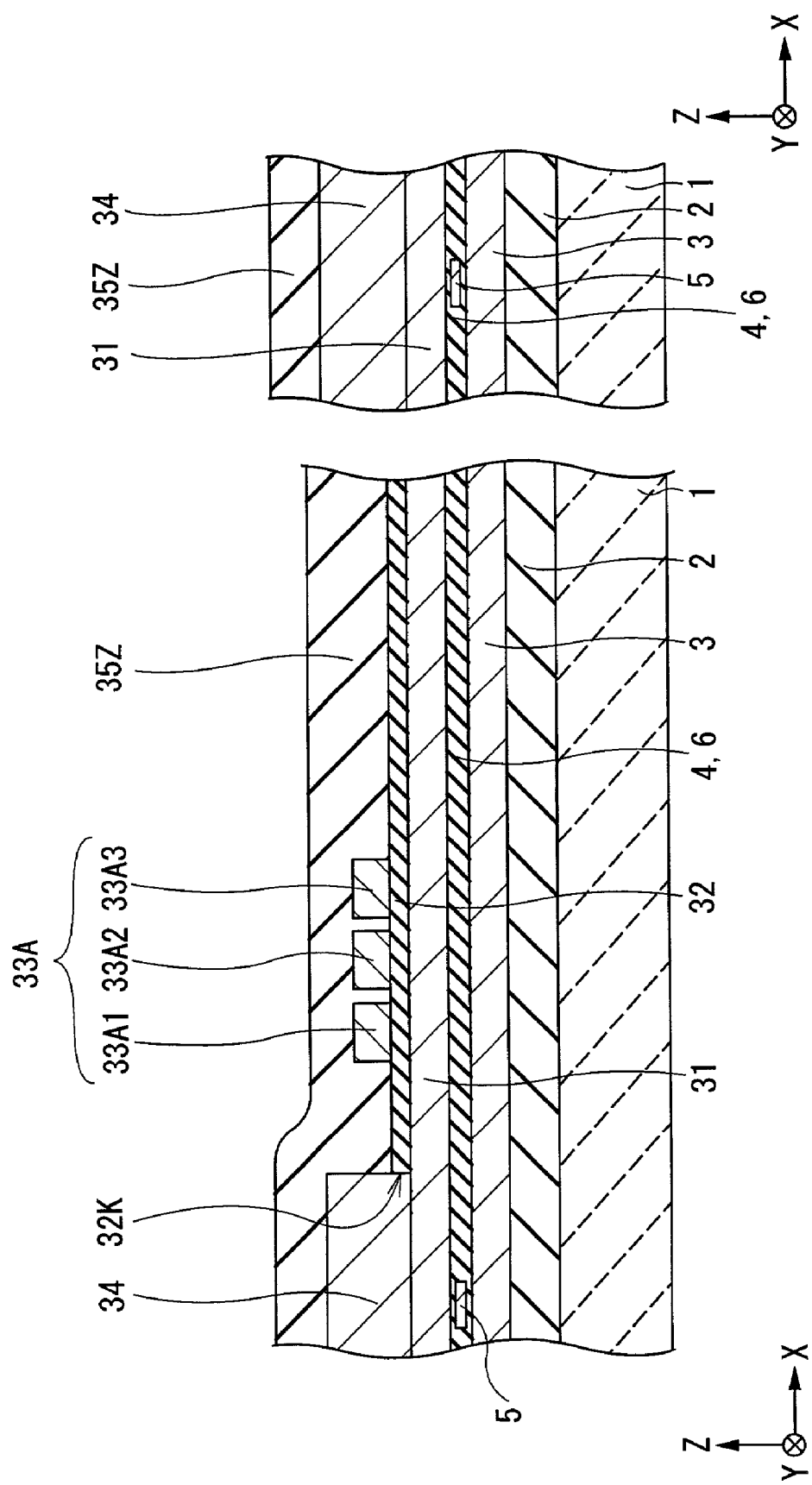
FIGS. 25A and 25B are cross-sectional views for explaining one process in a method of manufacturing a thin film magnetic head according to a second embodiment of the invention.

In the embodiment, after forming the shield gap film 6, at first, as shown in FIGS. 25A and 25B, on the shield gap film 6, a top shield layer 31 made of, for example, Permalloy is selectively formed with a thickness of approximately 1.0 $\mu$m to 2.0 $\mu$m by, for example, plating.

Figure 32:
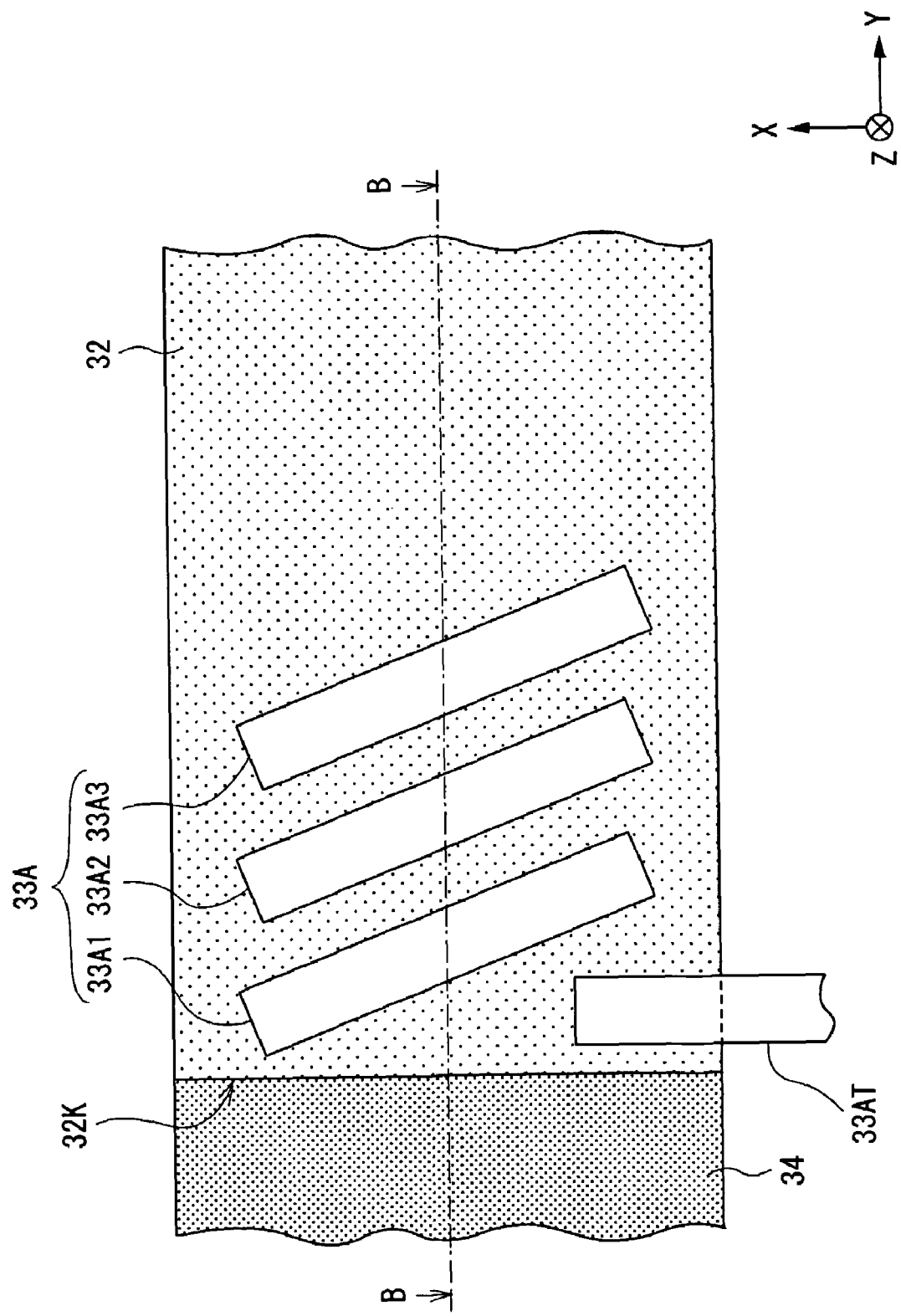
FIG. 32 is a plane view corresponding to the cross-sectional views shown in FIGS. 25A and 25B.

Next, as shown in FIGS. 25A, 25B and 32, on the top shield layer 31, an insulating layer 32 made of, for example, alumina is selectively formed with a thickness of approximately 0.1 $\mu$m to 0.2 $\mu$m by, for example, sputtering. The insulating layer 32 is formed so as not to cover a space 32K where another top shield layer 34 is formed in a later process.

As shown in FIGS. 25A, 25B and 32, on the insulating layer 32, strap-like coil patterns 33A (33A1, 33A2, 33A3) made of metallic material such as copper, gold or aluminum is selectively formed with a thickness of approximately 1.0 $\mu$m to 1.5 $\mu$m. At the same time that the coil patterns 33A are formed, a connecting terminal 33AT is selectively formed on the insulating layer 32 from a region near the space 32K to an external circuit (not shown). The coil patterns 33A constitute parts of a thin film coil 33 (refer to FIGS. 30A, 30B and 37). The coil patterns 33A are aligned so as to connect with a series of the coil patterns (33B, 33C and 33D) which will be formed in a later process, and consequently form the thin film coil 33 as an assembly of the series of the coil patterns. More specifically, the longitudinal direction of the coil patterns 33A (33A1 to 33A3) is placed so as to be inclined toward the width direction (the X-axis direction in the drawings).

Next, as shown in FIGS. 25A, 25B and 32, in the space 32K, a top shield layer 34 made of, for example, Permalloy is selectively formed with a thickness of approximately 2.5 $\mu$m to 3.0 $\mu$m by, for example, plating. Then, a precursory insulating layer 35Z made of, for example, alumina is formed with a thickness of approximately 3.0 $\mu$m to 4.0 $\mu$m by, for example, sputtering so as to cover an uneven region consisting of the coil patterns 33A, the top shield layer 34 and so on. In FIG. 32, the precursory insulating layer 35Z is not shown.

Next, as shown in FIGS. 26A and 26B, the whole surface of the precursory insulating layer 35Z is polished and flattened by, for example, CMP (chemical mechanical polishing) so as to form an insulating layer 35 with which the coil patterns 33A and the like are filled. When forming the insulating layer 35, the polishing process is carried out until at least the top shield layer 34 is exposed.

Figure 33:
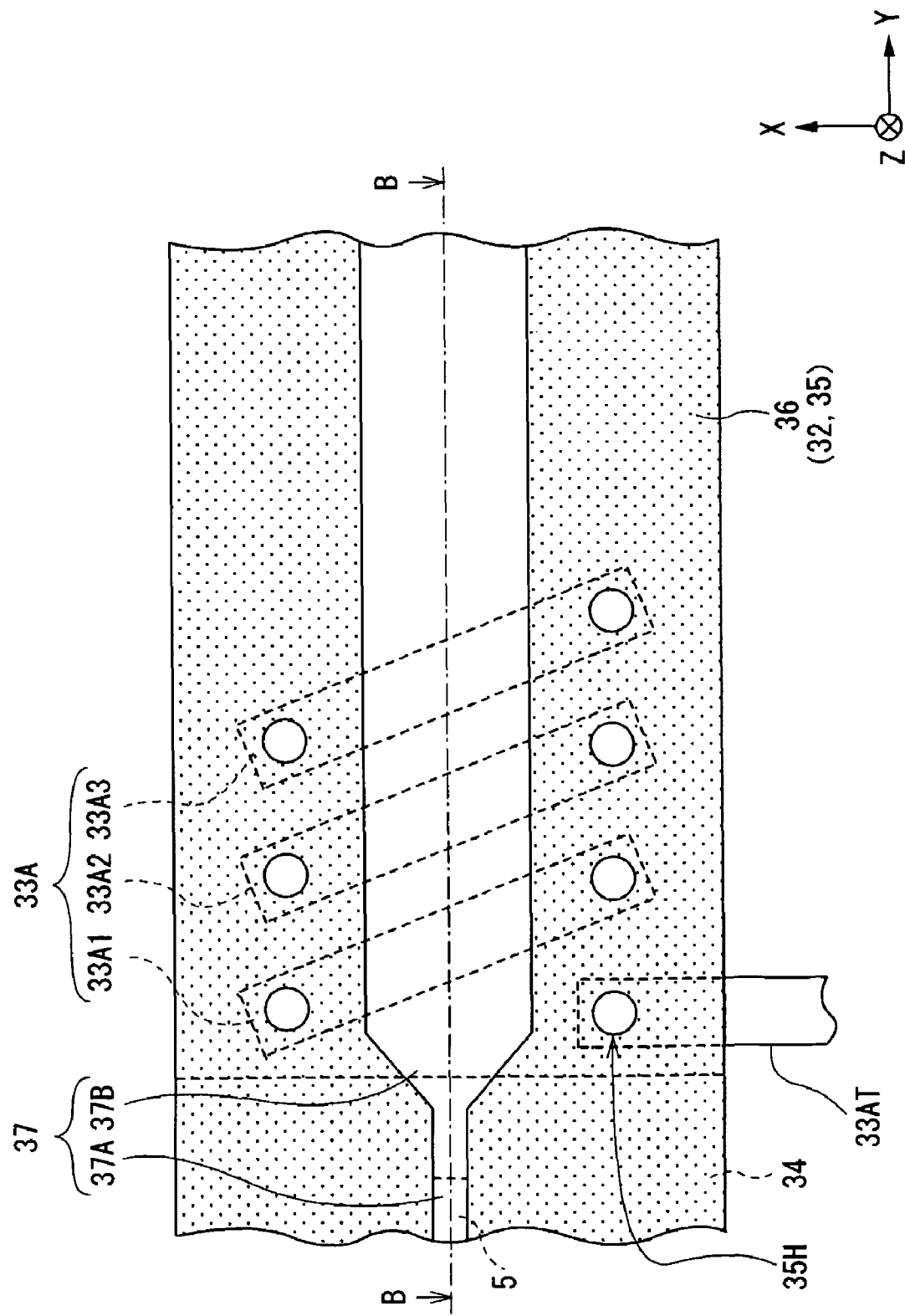
FIG. 33 is a plane view corresponding to the cross-sectional views shown in FIGS. 26A and 26B.

As shown in FIG. 33, parts of the insulating layer 35 respectively corresponding to each end of the coil patterns 33A1 to 33A3 and an end of the connecting terminal 33AT are selectively etched and dug down so as to form a plurality of connecting holes 35H, each of which has, for example, the shape of a circular opening. The connecting holes 35H are for connecting the coil patterns 33A and the connecting terminal 33AT with the coil patterns 33B which are formed in a later process (refer to FIGS. 28A, 28B and 35). The opening shape of the connecting holes 35H is not necessarily limited to circular shape, and can be freely modified to any other shape.

Next, as shown in FIGS. 26A, 26B and 33, an insulating layer 36 made of, for example, alumina is formed with a thickness of approximately 0.1 μm to 0.2 μm on the whole surface by, for example, sputtering. As shown in FIG. 33, the insulating layer 36 is formed so as not to cover the connecting holes 35H which have been formed in the foregoing process. In the above descriptions, after forming the connecting holes 35H, the insulating layer 36 is formed so as not to cover the connecting holes 35H, but it is not necessarily limited to this, and for example, after forming the insulating layers 35 and 36, the both insulating layers 35 and 36 may be selectively etched and dug down to form the connecting holes 35H.

Next, as shown in FIGS. 26A, 26B and 33, in a region surrounded by a group of the connecting holes 35H of the insulating layer 35, a bottom pole 37 made of, for example, Permalloy is selectively formed with a thickness of approximately 2.0 μm to 3.0 μm by, for example, plating so as to cross the coil patterns 33A1 to 33A3. As shown in FIG. 33, for example, the bottom pole 37 is formed so as to comprise a tip portion 37A and a rear end portion 37B corresponding to the tip portion 13A and the yoke portion 13B of the top pole 13 in the first embodiment, respectively. The bottom pole 37 corresponds to a specific example of "one of the two magnetic layers" in the invention.

Figures 27A, 27B:
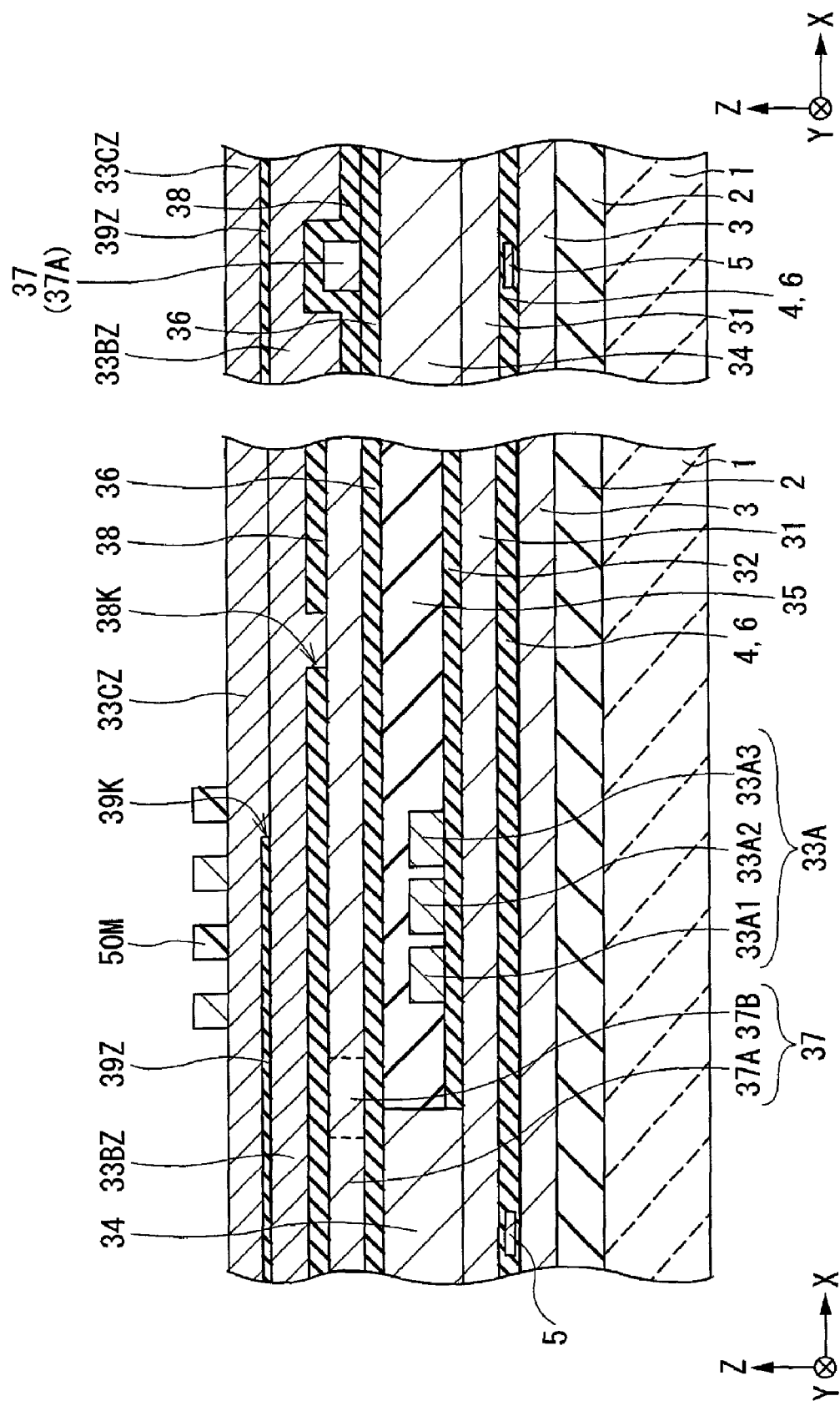
FIGS. 27A and 27B are cross-sectional views for explaining a process following the process shown in FIGS. 26A and 26B.
Figure 34:
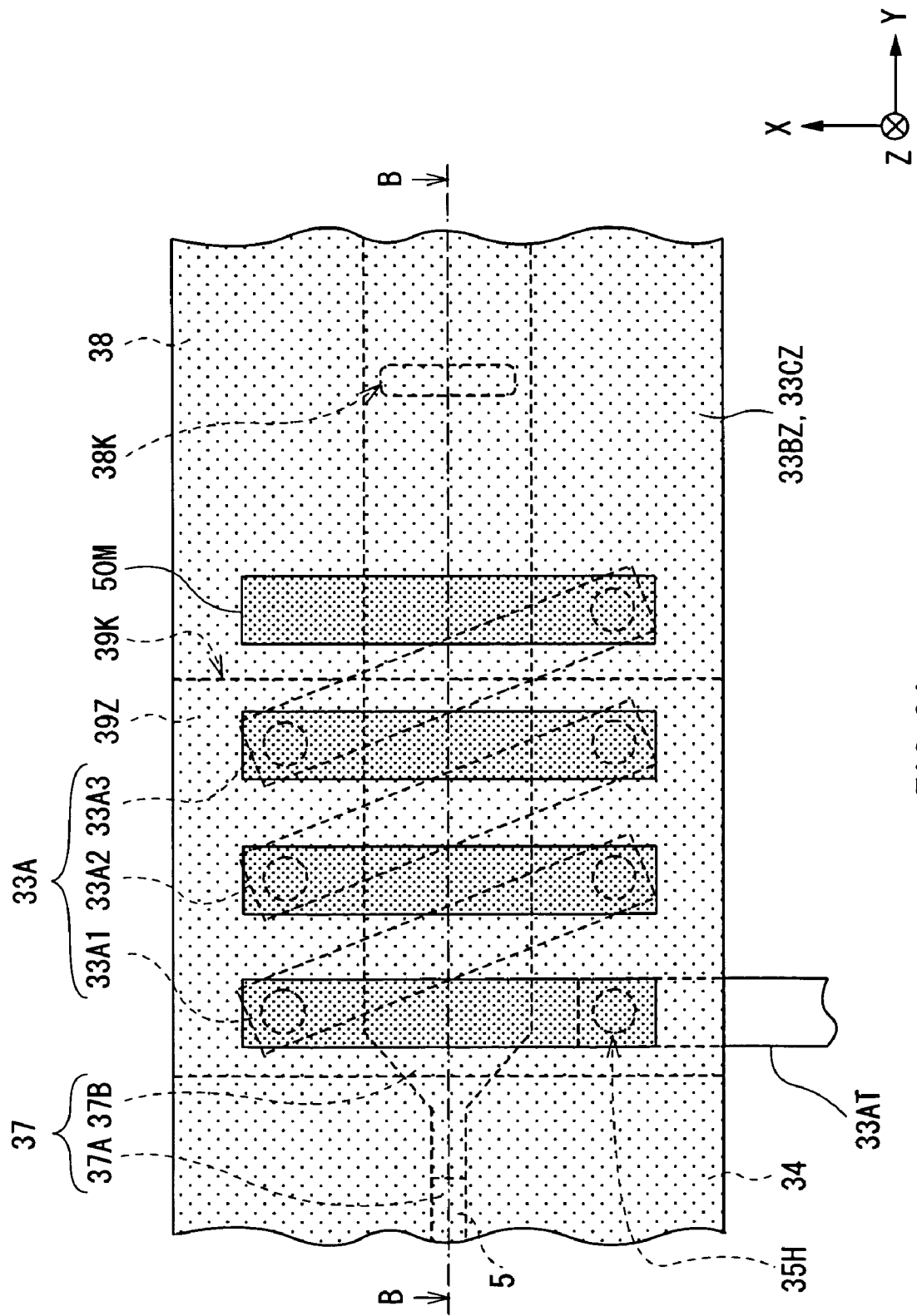
FIG. 34 is a plane view corresponding to the cross-sectional views shown in FIGS. 27A and 27B.

Next, as shown in FIGS. 27A, 27B and 34, on the whole surface, a write gap layer 38 made of, for example, alumina is formed with a thickness of approximately 0.1 μm to 0.3 μm by, for example, sputtering. The write gap layer 38 is formed so as not to cover an opening 38K for connecting the bottom pole 37 with the top pole 41 which will be formed in a later process (refer to FIGS. 29A, 29B and 36). The write gap layer 38 corresponds to a specific example of a "gap layer" in the invention.

Next, as shown in FIGS. 27A, 27B and 34, by using the same method and materials for forming the precursory layer 10AZ, the separate precursory layer 11Z and the precursory layer 10BZ in the first embodiment, a precursory layer 33BZ (with a thickness of approximately 1.0 μm to 1.5 μm), a separate precursory layer 39Z (with a thickness of approximately 10 nm to 50 nm) and a precursory layer 33CZ (with a thickness of approximately 1.0 μm to 1.5 μm) are laminated in order so as to cover the whole surface. At this time, the first precursory layer 33BZ is formed so that the connecting holes 35H, which have been formed in the foregoing process, are filled with the first precursory layer 33BZ, and the separate precursory layer 39Z is formed so as not to cover a rear space 39K where coil patterns 33B4 and 33C4 will be formed in a later process. The precursory layers 33BZ and 33CZ are electrically connected to each other through the space 39K. The precursory 33BZ corresponds to a specific example of a "first precursory layer" in the invention, and the precursory layer 33CZ corresponds to a specific example of a "second precursory layer" in the invention.

Next, a photo resist is coated on the surface of the precursory layer 33CZ so as to form a photo resist film, and then the photo resist film is patterned by high-accuracy photolithography so as to selectively form a mask 50M, as shown in FIGS. 27A, 27B and 34. The mask 50M is formed so as to have a strap-like planer shape corresponding to planer shapes of the coil patterns 33B (33B1 to 33B4), 33C (33C1 to 33C4) and a separate layer 39 (refer to FIGS. 28A, 28B and 35) which will be formed in a later process.

Figures 28A, 28B:
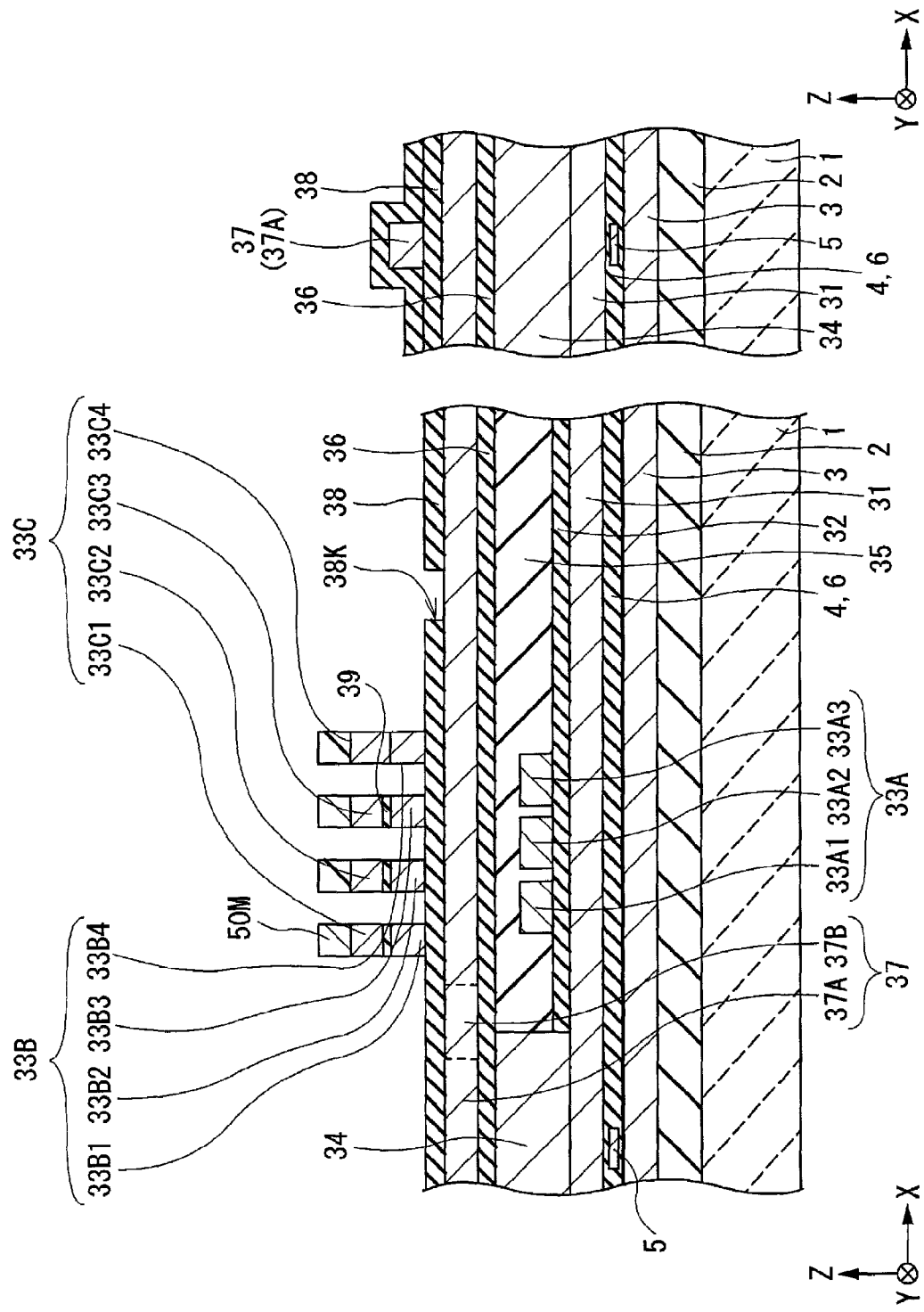
FIGS. 28A and 28B are cross-sectional views for explaining a process following the process shown in FIGS. 27A and 27B.
Figure 35:
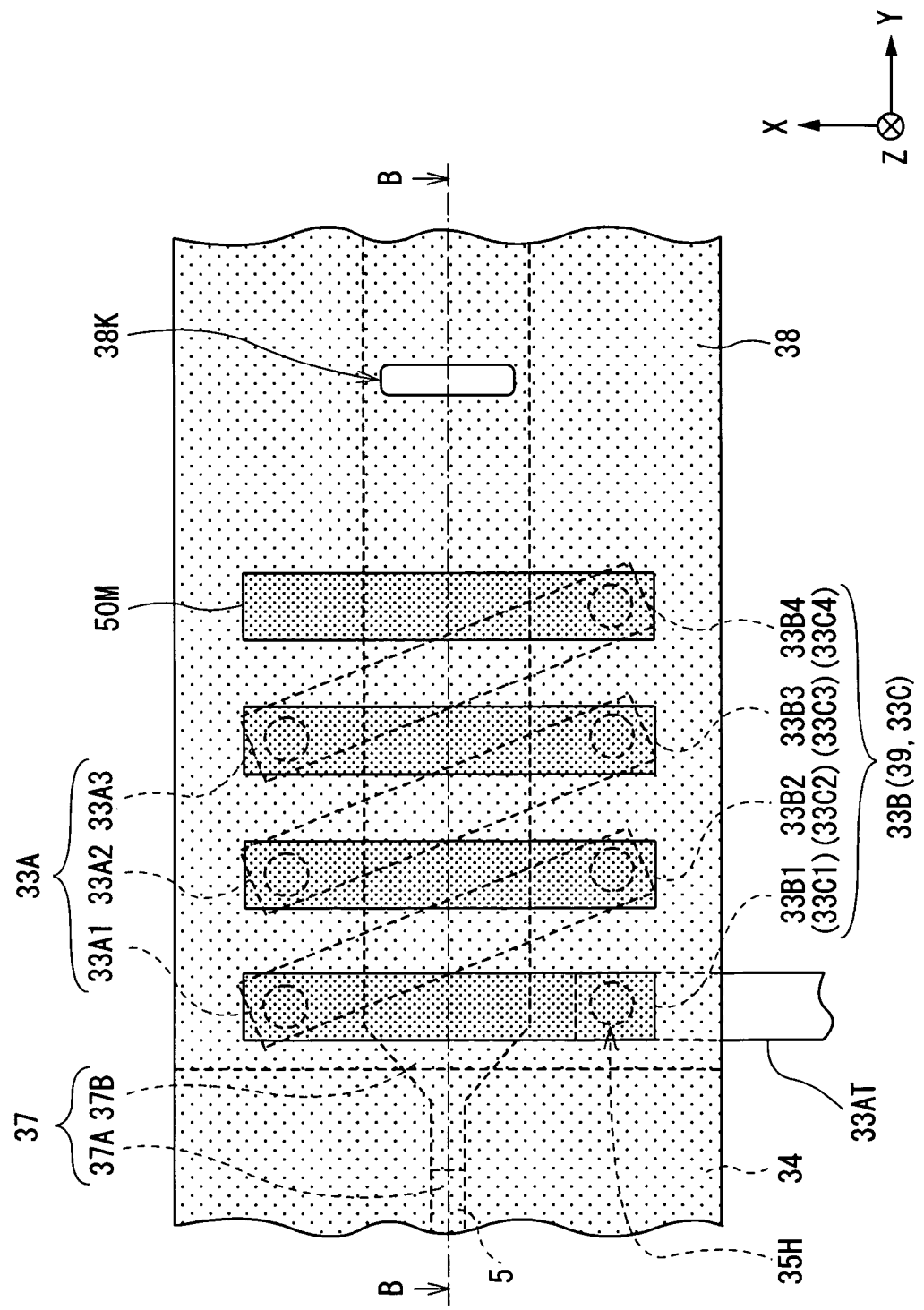
FIG. 35 is a plane view corresponding to the cross-sectional views shown in FIGS. 28A and 28B.

Next, with using the mask 50M, for example, by use of the same conditions as those when etching the precursory layer 10AZ, the separate precursory layer 11Z and the precursory layer 10BZ in the first embodiment, the precursory layer 33BZ, the separate precursory layer 39Z and the precursory layer 33CZ is continuously etched by RIE. Thereby, as shown in FIGS. 28A, 28B and 35, the coil patterns 33B (33B1, 33B2, 33B3 and 33B4), the separate layer 39 and the coil patterns 33C (33C1, 33C2, 33C3 and 33C4) are selectively formed. In the etching process of forming the coil patterns 33B, the bottom pole 37 is exposed in the opening 38K. The coil patterns 33B (33B1 to 33B4) are connected with the coil patterns 33A (33A1 to 33A3) and the connecting terminal 33AT through the connecting holes 35H. The coil patterns 33B1 to 33B3 correspond to an example of a "first hierarchical pattern" in the invention, and the coil patterns 33C1 to 33C3 correspond to an example of a "second hierarchical pattern" in the invention.

Figures 29A, 29B:
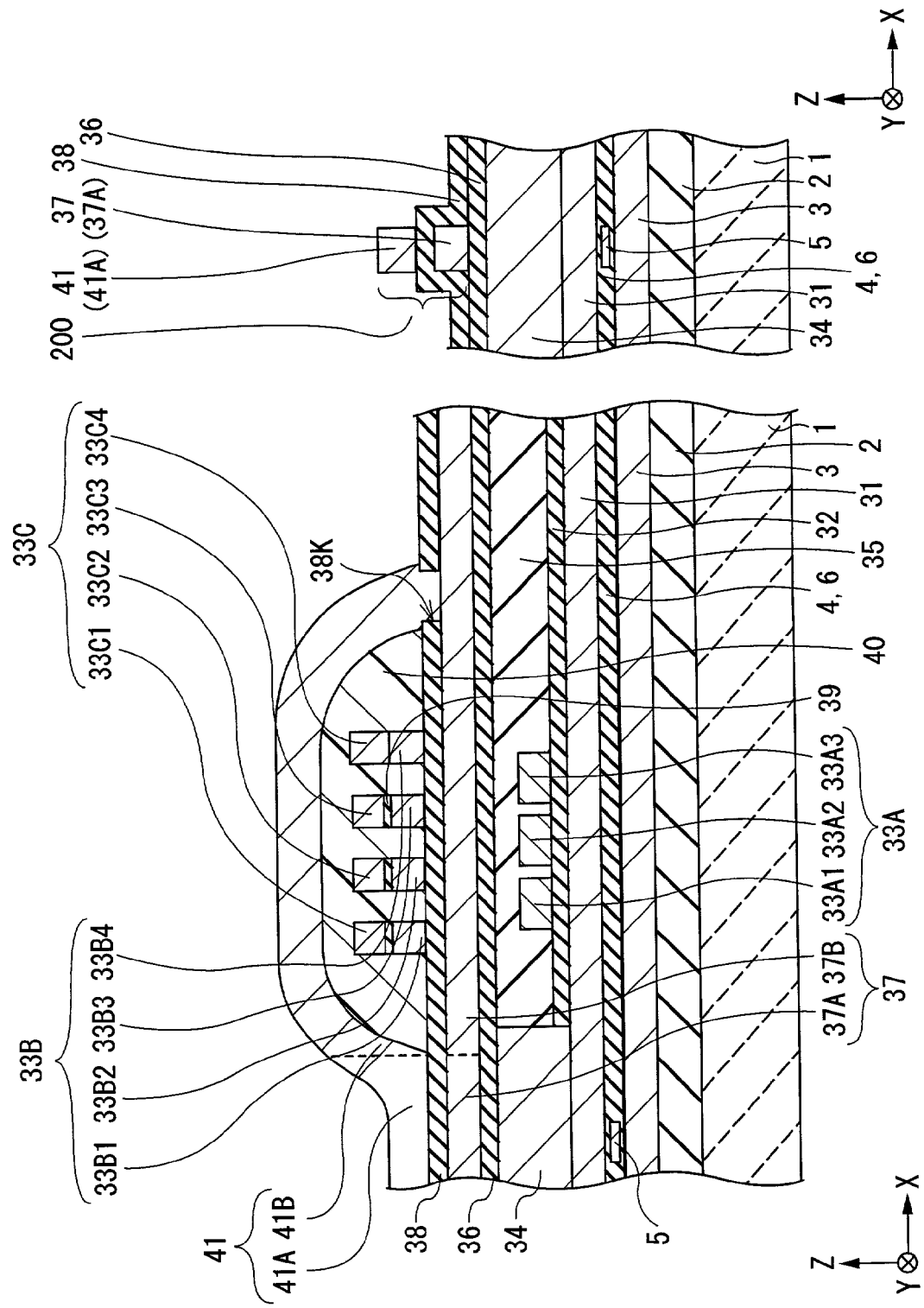
FIGS. 29A and 29B are cross-sectional views for explaining a process following the process shown in FIGS. 28A and 28B.
Figure 36:
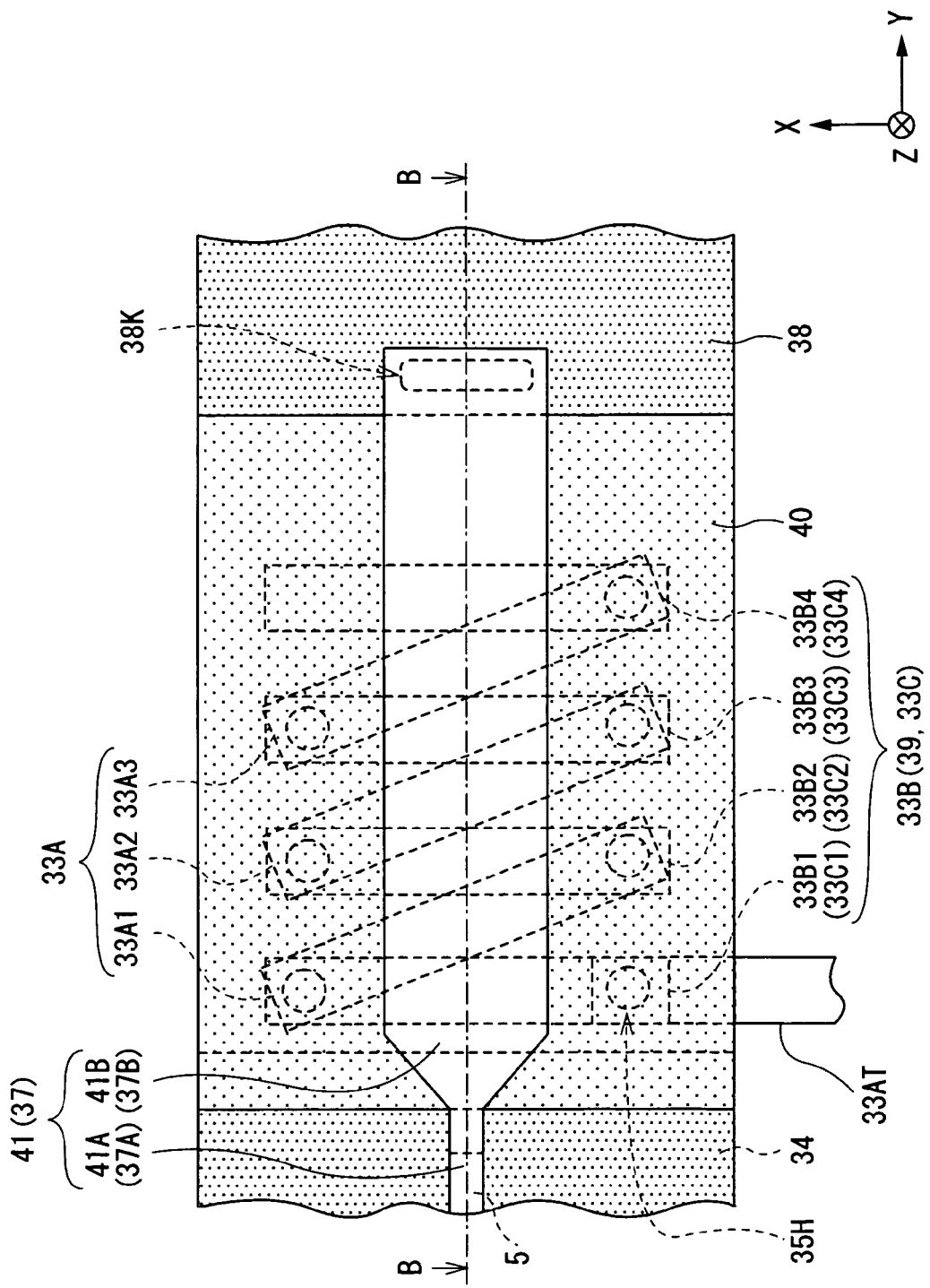
FIG. 36 is a plane view corresponding to the cross-sectional views shown in FIGS. 29A and 29B.

Next, as shown in FIGS. 29A, 29B and 36, by use of the same method and material for forming the insulating layer 12 in the first embodiment, an insulating layer 40 for electrically insulating the coil patterns 33B and 33C from their peripheral regions is selectively formed so as to cover the coil patterns 33B and 33C, the separate layer 39 and their peripheral regions. The insulating layer 30 is formed so as not to cover the opening 38K which has been formed in the write gap layer 38 in the foregoing process.

Next, as shown in FIGS. 29A, 29B and 36, the top pole 41 made of, for example, Permalloy is formed with a thickness of approximately 2.0 μm to 3.0 μm by, for example, plating so as to cover the insulating layer 40 from the write gap layer 38, which will be the air bearing surface 20 in a later process, to an exposed surface of the bottom pole 37 in the opening 38K, and so as to be opposed to the bottom pole 37. The top pole 41 is formed so as to comprise a tip portion 41A and a yoke portion 41B corresponding to the tip portion 13A and the yoke portion 13B of the top pole 13 in the first embodiment, respectively. The top pole 41 is magnetically coupled with the bottom pole 37 in the opening 38K, so that a magnetic path is formed by the bottom pole 37 and the top pole 41. Thereby, as shown in FIG. 29B, a pole tip portion 200 having the trim structure is formed. The top pole 41 corresponds to a specific example of "the other of the two magnetic layers" in the invention.

Figures 30A, 30B:
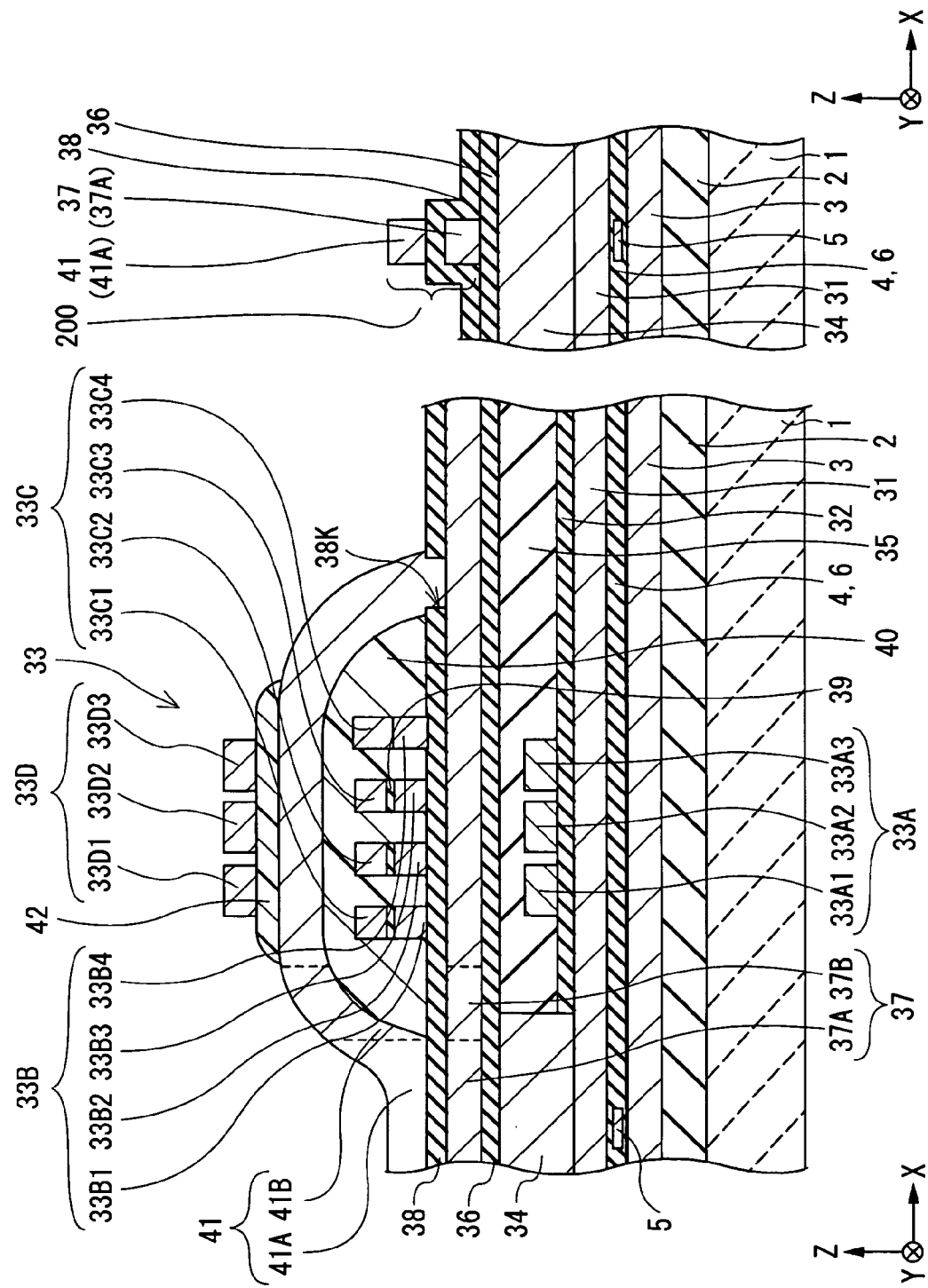
FIGS. 30A and 30B are cross-sectional views for explaining a process following the process shown in FIGS. 29A and 29B.
Figure 37:
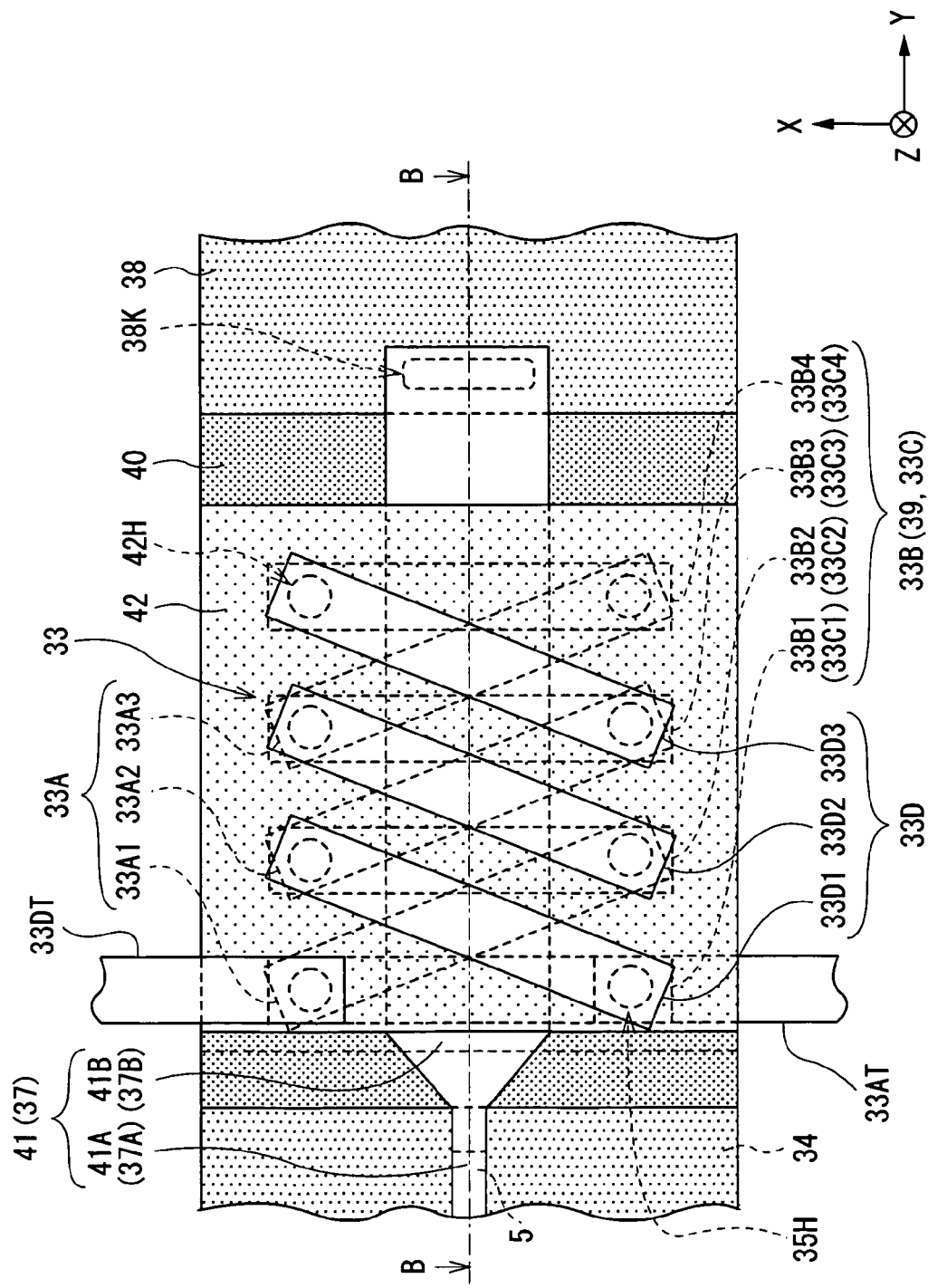
FIG. 37 is a plane view corresponding to the cross-sectional views shown in FIGS. 30A and 30B.

Next, as shown in FIGS. 30A, 30B and 37, by use of, for example, the same method and material for forming the insulating layer 40, an insulating layer 42 is selectively formed so as to cover a region of the top pole 41 corresponding to the coil patterns 33C (33C1 to 33C4). The insulating layer 42 is for electrically insulating the top pole 41 from the coil patterns 33D which will be formed in a later process. The insulating layers 32, 35, 36, 40 and 42 correspond to an example of "insulating layers" in the invention.

Next, as shown in FIG. 37, parts of the insulating layer 42 respectively corresponding to each end of the coil patterns 33C1 to 33C3 and an end of the coil pattern 33C4 are etched to selectively form connecting holes 42H in the insulating layer 42.

Next, as shown in FIGS. 30A, 30B and 37, by use of, for example, the same method and material for forming the coil pattern 33A, the strap-like coil patterns 33D (33D1, 33D2 and 33D3) are selectively formed with a thickness of approximately 1.0 $\mu$m to 1.5 $\mu$m so as to cross the coil patterns 33A (33A1 to 33A3). At the same time that the coil patterns 33D are formed, a connecting terminal 33DT is selectively formed from an end portion of the coil pattern 33C1 to the external circuit (not shown). The coil patterns 33D and the connecting terminal 33DT are connected with the coil patterns 33C and 33B through the connecting holes 42H, and also connected with the coil pattern 33A through the connecting holes 35H. Thereby, as an assembly of the coil patterns 33A (33A1 to 33A3), 33B (33B1 to 33B4), 33C (33C1 to 33C4) and 33D (33D1 to 33D3), a thin film coil 33 is formed.

Figures 31A, 31B:
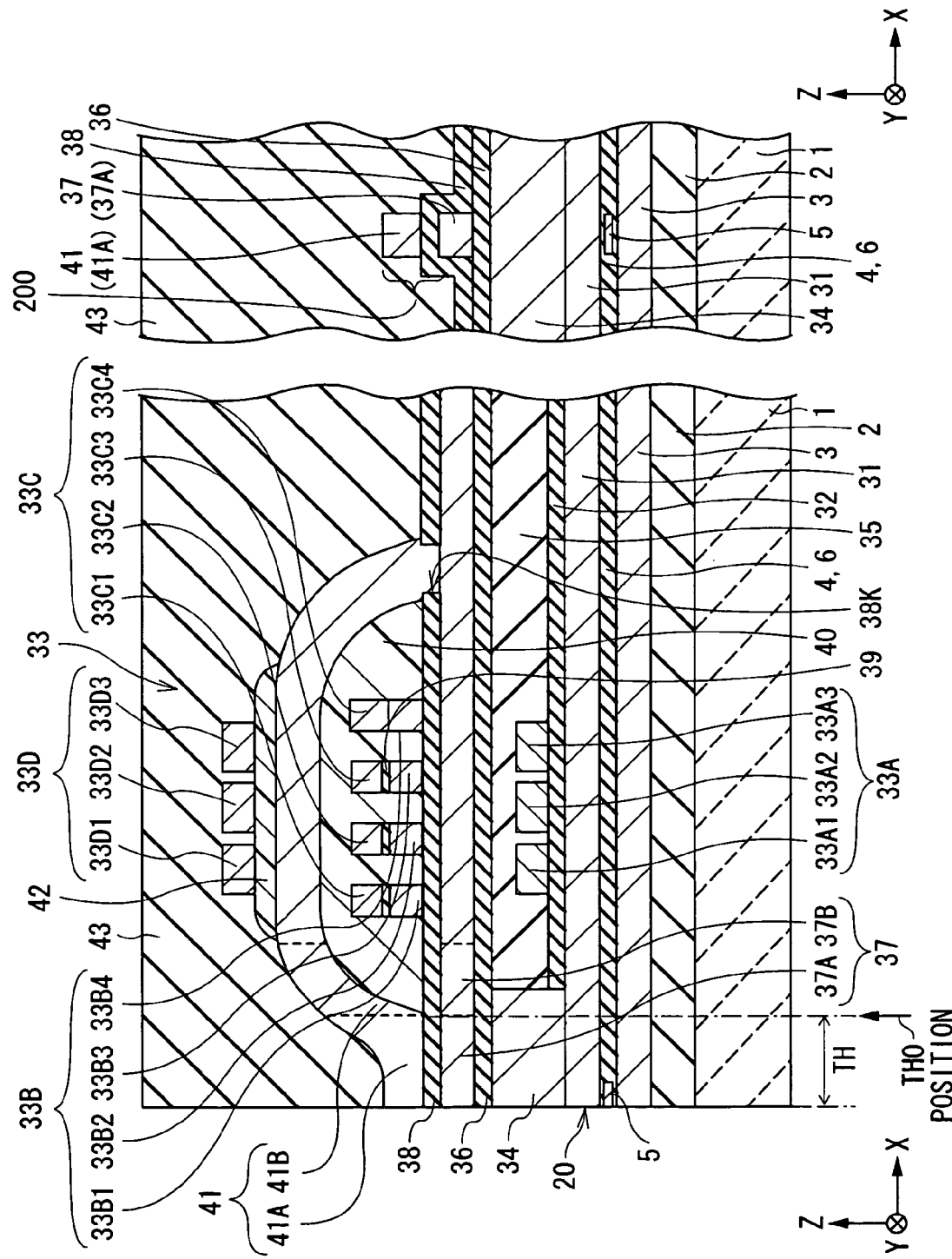
FIGS. 31A and 31B are cross-sectional views for explaining a process following the process shown in FIGS. 30A and 30B.
Figure 38:
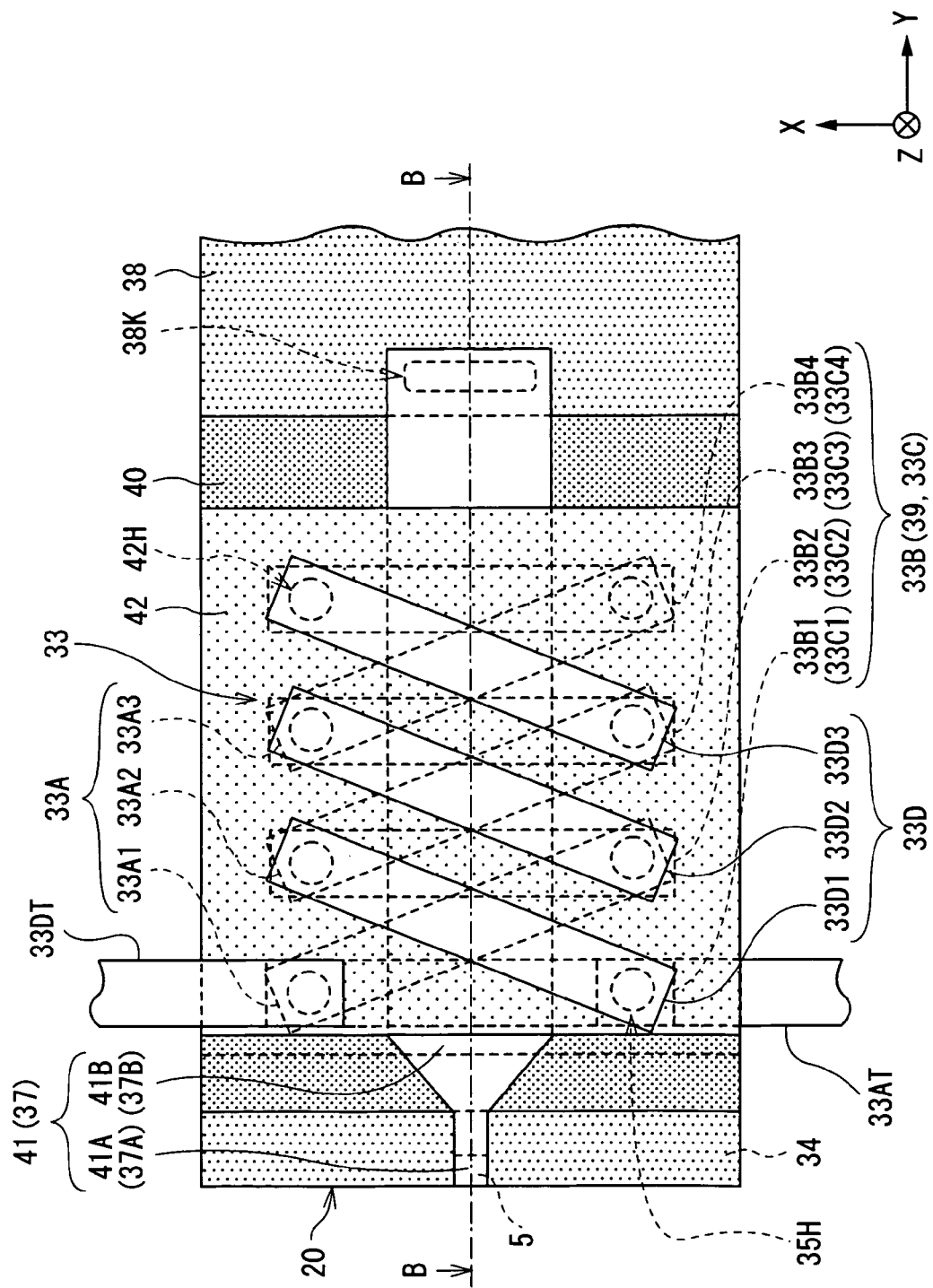
FIG. 38 is a plane view corresponding to the cross-sectional views shown in FIGS. 31A and 31B.

Next, as shown in FIGS. 31A, 31B and 38, an overcoat layer 43 made of, for example, an inorganic insulating layer such as alumina is formed with a thickness of approximately 20 $\mu$m to 40 $\mu$m so as to cover the whole, and then the air bearing surface 20 is formed by mechanical processing and polishing to complete the thin film magnetic head.

<Configuration of Thin Film Magnetic Head>

Figure 39:
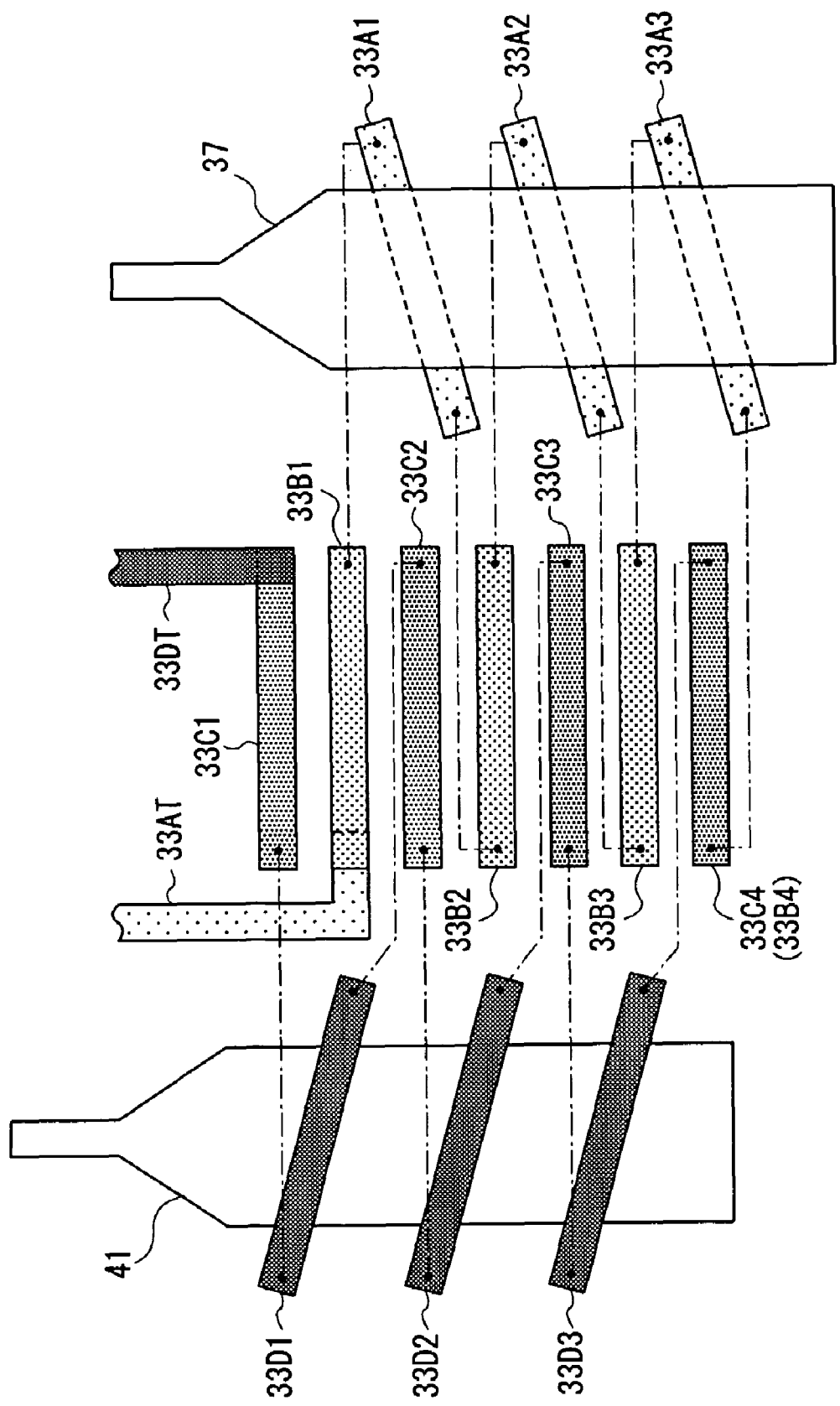
FIG. 39 is a plane view for explaining the connection state of a thin film coil in the thin film magnetic head according to the second embodiment of the invention.

With reference to FIGS. 31A, 31B, 38 and 39, the configuration of the thin film coil 33 in the thin film magnetic head according to the embodiment will be described hereinafter. FIG. 39 schematically shows the connection state of the thin film coil 33.

As described above, the thin film coil 33 comprises an assembly of the coil patterns 33A (33A1 to 33A3), 33B (33B1 to 33B4), 33C (33C1 to 33C4) and 33D (33D1 to 33D3), each of which is separately formed. The coil patterns 33B1 to 33B3 and 33C1 to 33C3 are electrically separated by the separate layer 39, and have the same planar shapes. An end of each of the coil patterns 33B1 to 33B3 is connected with an end of each of the coil patterns 33A1 to 33A3, respectively. The other end of coil pattern 33B1 is connected to the connecting terminal 33AT, and the other end of each of the coil patterns 33B2 and 33B3 is connected with the other end of each of the coil pattern 33A1 and 33A2. The other end of coil pattern 33B4 which is electrically connected with the coil pattern 33C4 is connected with the other end of the coil pattern 33A3. That is, the coil patterns 33A and 33B are wound around the bottom pole 37 (the rear end portion 37B) (a first winding portion). On the other hand, an end of the coil pattern 33C1 is connected to the connecting terminal 33DT, and an end of each of the coil patterns 33C2 to 33C4 is connected to an end of each of the coil patterns 33D1 to 33D3, respectively. The other end of each of the coil patterns 33D1 to 33D3 is connected with the other end of each of the coil patterns 33C1 to 33C3, respectively. That is, the coil patterns 33C and 33D are wound around the top pole 41 (the yoke portion 41B) (a second winding portion). The thin film coil 33 can be energized through the connecting terminals 33AT and 33DT.

<Operations of Thin Film Magnetic Head>

Figure 40:
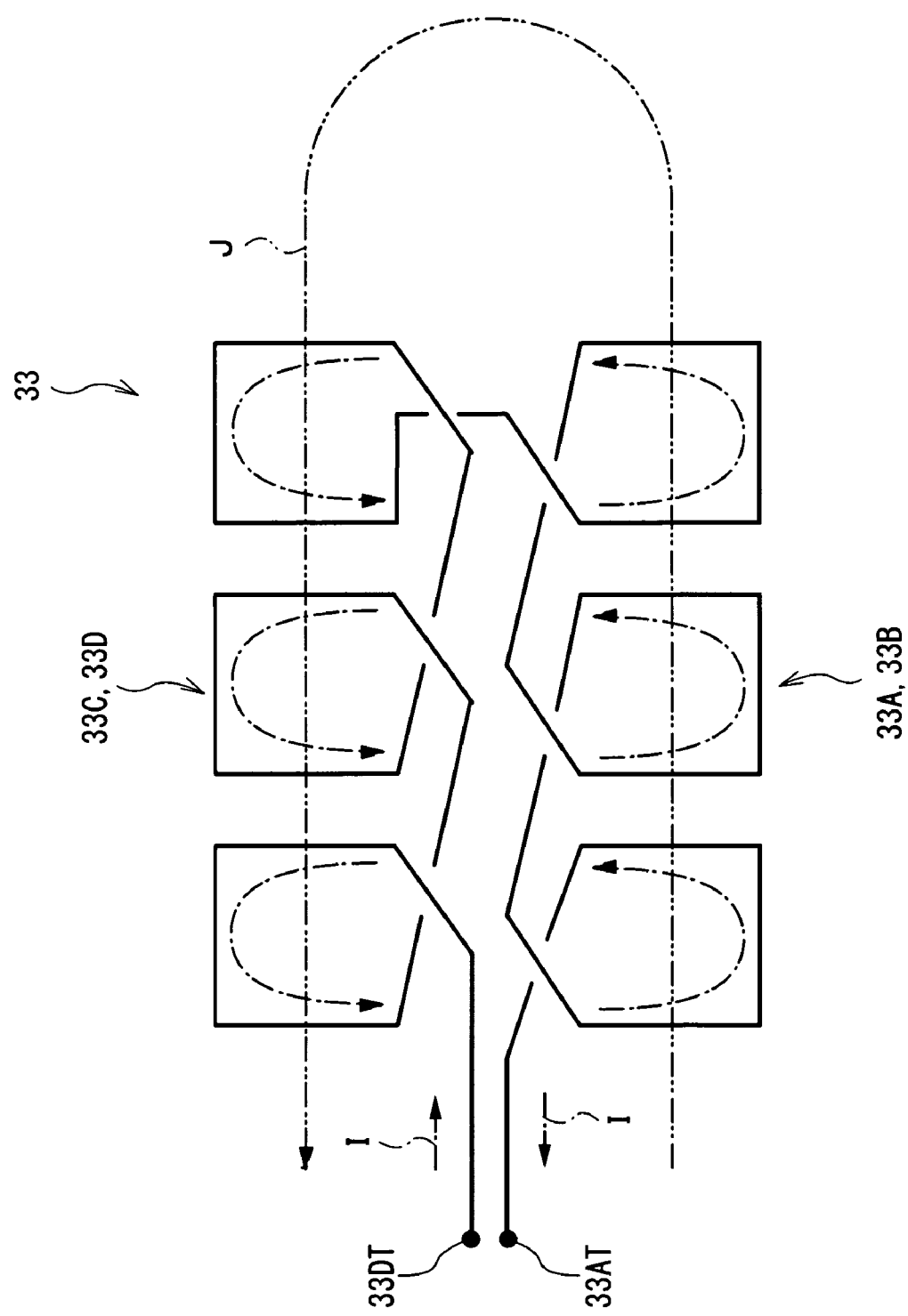
FIG. 40 is a simplified diagram showing a structure of the thin film coil in the thin film magnetic head according to the second embodiment of the invention.

Next, with reference with FIGS. 31A, 31B, 38, 39 and 40, among operations of the thin film magnetic head according to the embodiment, the condition of magnetic flux generation during recording will be mainly explained. FIG. 40 simply shows the structure of the completed thin film coil 33 with one line.

In the thin film magnetic head, during recording information, for example, as a current I flows from the connecting terminal 33DT to the connecting terminal 33AT, a magnetic flux J will be generated. At this time, in the coil patterns 33A and 33B (the first winding portion) wound around the bottom pole 37, as the current I flows in a counterclockwise direction when viewed from the opposite side of the air bearing surface 20, a flow of the magnetic flux J toward the rear in the bottom pole 37 will be produced. On the other hand, in the coil patterns 33C and 33D (the second winding portion) wound around the top pole 41, as the current I flows in a counterclockwise direction when viewed from the side of the air bearing surface 20, a flow of the magnetic flux J toward the front in the top pole 41 will be produced. Therefore, the magnetic flux generated in the thin film coil 33 propagates from the bottom pole 37 to the top pole 41 (the tip portion 41A) through a magnetic path.

<Effects of the Embodiment>

In the embodiment, as shown in FIGS. 27A, 27B, 28A, 28B, 34, and 35, the precursory layer 33BZ, the separate precursory layer 39Z and the precursory layer 33CZ are continuously patterned to form the coil patterns 33B (33B1 to 33B4), the separate layer 39 and the coil patterns 33C (33C1 to 33C4), respectively. Thereby, in the formation of the coil patterns 33B and 33C, only one photolithography process is required to form the mask 50M, and consequently the number of processes of forming the thin film coil 33 is reduced due to the same actions as those in the case where the thin film coil 10 (the coil patterns 10A and 10B) is formed in the first embodiment,. Therefore, as the time for manufacturing the thin film coil 33 is reduced, the time for manufacturing the thin film magnetic head can be reduced.

Any configuration, operation, action, effect, modification and so on other than those described above are equal to those of the first embodiment, and will not be further explained.

The present invention has been described with reference to some embodiments. The invention is not limited to the above-described embodiments, but can be variously modified. For example, forming methods, materials and structural characteristics of a series of components constituting the thin film magnetic head are not necessarily limited to those described in the above embodiments, but can be freely modified.

Further, for example, the composite thin film magnetic head has been described in the above-described embodiments, but the invention is also applicable to a recording-only thin film magnetic head having an inductive magnetic transducer for writing and a thin film magnetic head having an inductive magnetic transducer for recording and reproducing. Additionally, the invention is also applicable to a thin film magnetic head of the structure in which an element for writing and an element for reading are laminated in the opposite order.

Moreover, in the first embodiment, the invention is applied to forming the coil patterns 10A and 10B with the separate layer 11 sandwiched therebetween, but the invention is not necessarily limited to this, but is also applicable to form a thin film coil having hierarchical layer structure with three or more layers with separate layers sandwiched respectively therebetween.

As described above, in the method of manufacturing the thin film magnetic head according to the invention, after forming the first precursory layer, the separate precursory layer and the second precursory layer, these layers are continuously patterned to form the first hierarchical pattern, the separate layer and the second hierarchical pattern in a batch process. Therefore, the number of processes of manufacturing the thin film coil is fewer than that in the case where the first and second hierarchical patterns are formed in separate processes. Thereby, as the time for manufacturing the thin film coil is reduced, the time for manufacturing the thin film magnetic head can be reduced.

More specifically, in the method of manufacturing the thin film magnetic head according to an aspect of the invention, in the etching process, reactive ion etching is used, so that the etching process can be completed in a shorter time than that in the case where any other means for patterning such as ion milling is used.

Further, in the method of manufacturing the thin film magnetic head according to another aspect of the invention, an etching gas containing fluorine is used to etch the first and second precursory layers, and an etching gas containing chlorine is used to etch the separate precursory layer. Therefore, chemical reactions during etching are accelerated depending on the properties of materials to be etched, so the etching process can be completed in a shorter time.

Still further, in the thin film magnetic head according to an aspect of the invention, the first hierarchical pattern, the separate layer and the second hierarchical pattern are laminated in this order, and the first hierarchical pattern, the separate layer and the second hierarchical pattern are disposed in the same position so as to fully overlap one another and have the same planar shape, so the method of manufacturing the thin film magnetic head according to the invention is applicable to manufacture the thin film magnetic head with such a configuration.

In the thin film magnetic head according to another aspect of the invention, the separate layer has a thickness from 10 nm to 50 nm inclusive. As the separate layer becomes thinner, the length of the magnetic path is reduced, consequently resulting in an improvement in the high frequency response characteristic, and the filling factor (packing density) of the thin film coil is improved, consequently resulting in an improvement in the efficiency of the head.

Obviously many modifications and variations of the present invention are possible in the light of the above teachings. It is therefore to be understood that within the scope of the appended claims the invention may be practiced otherwise than as specifically described.

What is claimed is:

1. A method of manufacturing a thin film magnetic head including two magnetic layers magnetically coupled to each other, and having two magnetic poles which face each other with a gap layer in between, and face a recording medium, a thin film coil including a first hierarchical pattern and a second hierarchical pattern, and an insulating layer for insulating the thin film coil from the two magnetic layers, the method comprising:

a first step of forming a first precursory layer made from a group of materials consisting of copper, gold and aluminum as a preparatory layer of the first hierarchical pattern of the thin film;

a second step of forming a separate precursory layer made of an insulating material on the first precursory layer;

a third step of forming a second precursory layer as a preparatory layer of the second hierarchical pattern on the separate precursory layer; and a fourth step of continuously patterning the second precursory layer, the separate precursory layer and the first precursory layer to selectively form the second hierarchical pattern, a separate layer and the first hierarchical pattern, in a batch process, the separate layer electrically isolating the first hierarchical pattern from the second hierarchical pattern.

2. The method of manufacturing a thin film magnetic head according to claim 1, wherein the fourth step includes:

a process of forming a mask with a shape corresponding to a planar shape of the thin film coil on the second precursory layer; and an etching process of continuously etching the second precursory layer, the separate precursory layer and the first precursory layer with the use of the mask.

3. The method of manufacturing a thin film magnetic head according to claim 2, wherein reactive ion etching is used in the etching process.

4. The method of manufacturing a thin film magnetic head according to claim 3, wherein in the etching process, an etching gas containing fluorine is used to etch the first and second precursory layers, and an etching gas containing chlorine is used to etch the separate precursory layer.

5. The method of manufacturing a thin film magnetic head according to claim 1, wherein the first precursory layer, the separate precursory layer and the second precursory layer are formed by sputtering.

6. The method of manufacturing a thin film magnetic head according to claim 1, wherein the insulating material used in the second step contains either aluminum oxide or silicon dioxide.

7. The method of manufacturing a thin film magnetic head according to claim 1, wherein in the second step, the separate precursory layer is formed with a thickness from 10 nm to 50 nm inclusive.

* * * * *

UNITED STATES PATENT AND TRADEMARK OFFICE
CERTIFICATE OF CORRECTION

| | |
|---|---|
| PATENT NO. | : 6,971,156 B2 |
| APPLICATION NO. | : 10/117732 |
| DATED | : December 6, 2005 |
| INVENTOR(S) | : Naoto Matono |

It is certified that error appears in the above-identified patent and that said Letters Patent is hereby corrected as shown below:

On Title Page, Item (73) Col. 1

"Sae Magnetics (H.K.) Ltd.," should be - -SAE Magnetics (H.K.) Ltd., - -

Signed and Sealed this

Fifth Day of September, 2006

JON W. DUDAS
*Director of the United States Patent and Trademark Office*